(12) United States Patent
Li et al.

(10) Patent No.: US 12,228,698 B2
(45) Date of Patent: Feb. 18, 2025

(54) OPTICAL IMAGING LENS ASSEMBLY

(71) Applicant: ZHEJIANG SUNNY OPTICS CO., LTD., Yuyao Zhejiang (CN)

(72) Inventors: Long Li, Yuyao Zhejiang (CN); Jianke Wenren, Yuyao Zhejiang (CN); Fujian Dai, Yuyao Zhejiang (CN); Liefeng Zhao, Yuyao Zhejiang (CN)

(73) Assignee: ZHEJIANG SUNNY OPTICS CO., LTD., Yuyao Zhejiang (CN)

( * ) Notice: Subject to any disclaimer, the term of this patent is extended or adjusted under 35 U.S.C. 154(b) by 924 days.

(21) Appl. No.: 17/171,227

(22) Filed: Feb. 9, 2021

(65) Prior Publication Data
US 2021/0333516 A1    Oct. 28, 2021

(30) Foreign Application Priority Data

Apr. 27, 2020  (CN) .......................... 202010343329.3

(51) Int. Cl.
*G02B 13/00* (2006.01)
*G02B 9/60* (2006.01)
*G02B 27/00* (2006.01)

(52) U.S. Cl.
CPC ........... *G02B 13/0045* (2013.01); *G02B 9/60* (2013.01); *G02B 13/0065* (2013.01); *G02B 27/0025* (2013.01)

(58) Field of Classification Search
CPC ................ G03H 2223/18; G02B 9/60; G02B 13/0045; G02B 13/0065; G02B 13/02;
(Continued)

(56) References Cited

U.S. PATENT DOCUMENTS 7,227,706 B2 *  6/2007  Yagyu ................. G02B 15/177
                                                       359/833
8,792,185 B2 *  7/2014  Hsu ....................... G02B 13/18
                                                       359/714
(Continued)

FOREIGN PATENT DOCUMENTS

CN    109239903 A    1/2019
CN    212111953 U    12/2020
(Continued)

OTHER PUBLICATIONS

First Examination Report dated Jan. 14, 2022, in connection with India Patent Application No. 202114004924.

*Primary Examiner* — Stephone B Allen
*Assistant Examiner* — Daniel Jeffery Jordan
(74) *Attorney, Agent, or Firm* — Norris McLaughlin, P.A.

(57) ABSTRACT

The present disclosure discloses an optical imaging lens assembly including, sequentially from an object side to an image side along an optical axis, a first lens having negative refractive power; a first prism including an incident surface, a reflecting surface, and an exit surface, and an angle between the reflecting surface of the first prism and the optical axis being 45°; a stop; a second lens having positive refractive power; a third lens having refractive power; a fourth lens having positive refractive power; a fifth lens having negative refractive power; and a second prism including an incident surface, a reflecting surface, and an exit surface, and an angle between the reflecting surface of the second prism and the optical axis being 45°. A total effective focal length f and a maximum field-of-view FOV of the optical imaging lens assembly satisfy: 2.50 mm<$f*\tan^2(FOV/2)$<4.00 mm.

17 Claims, 12 Drawing Sheets

(58) Field of Classification Search
CPC .................. G02B 13/06; G02B 13/18; G02B 15/145511; G02B 15/145515; G02B 17/00; G02B 17/023; G02B 17/04; G02B 27/0025
USPC ............... 359/402, 659, 714, 746, 753, 763
See application file for complete search history.

(56) References Cited

U.S. PATENT DOCUMENTS

| | | |
|---|---|---|
| 9,470,879 B2* | 10/2016 | Gong .................. G02B 15/144 |
| 2011/0102660 A1* | 5/2011 | Mihara .......... G02B 15/144511 |
| | | 348/E5.025 |
| 2015/0316748 A1* | 11/2015 | Cheo ...................... G02B 7/005 |
| | | 359/694 |
| 2017/0108670 A1 | 4/2017 | Ko |
| 2018/0224633 A1 | 8/2018 | Wu et al. |
| 2019/0086638 A1 | 3/2019 | Lee et al. |
| 2021/0072515 A1* | 3/2021 | Chang .................. G02B 17/08 |

FOREIGN PATENT DOCUMENTS

| | | |
|---|---|---|
| DE | 102006025560 A1 | 12/2007 |
| JP | 2007133096 A | 5/2007 |

* cited by examiner

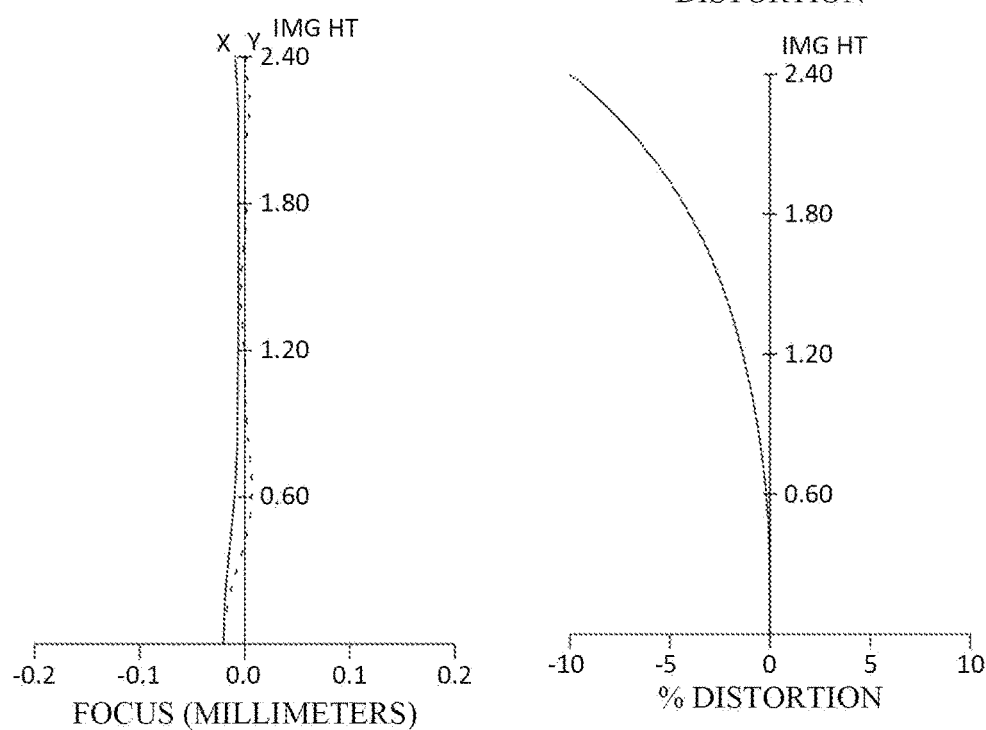
Fig. 2A
Fig. 2B
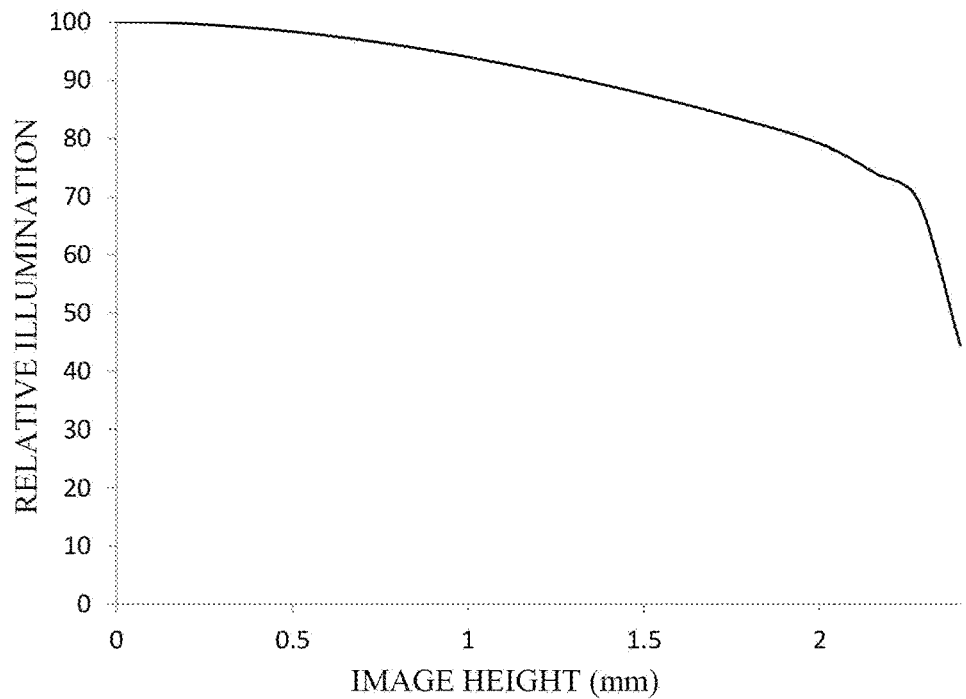
Fig. 2C

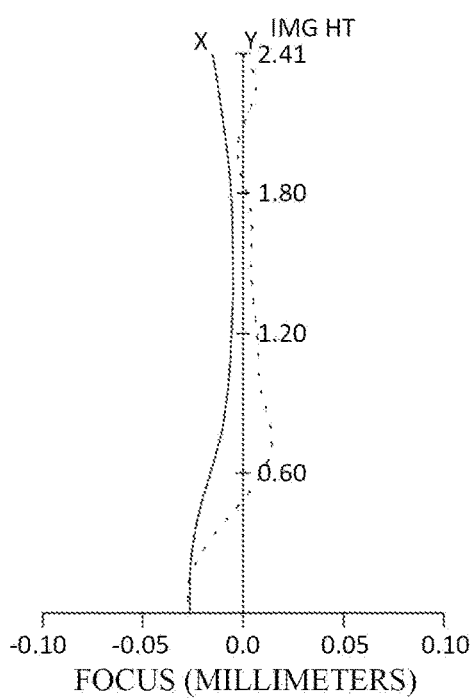
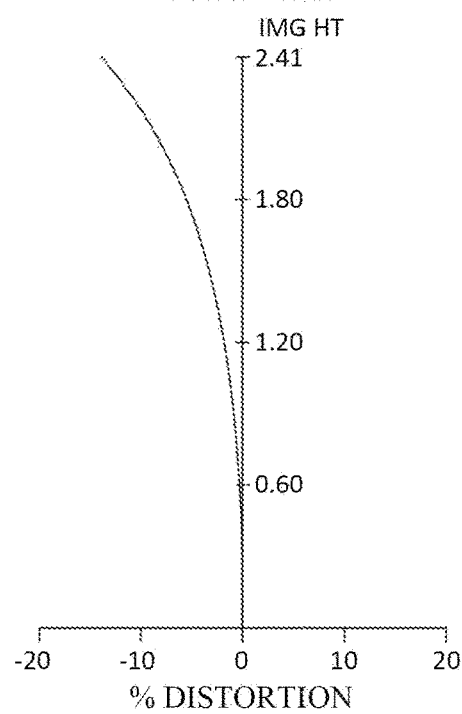
Fig. 8A
Fig. 8B
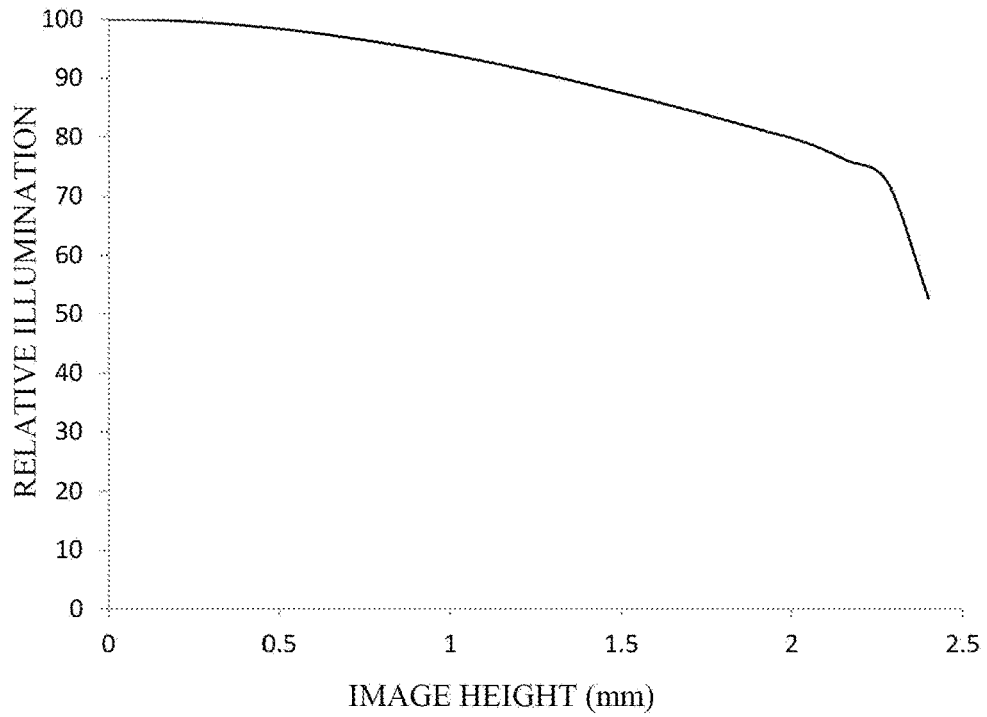
Fig. 8C

OPTICAL IMAGING LENS ASSEMBLY

CROSS-REFERENCE TO RELATED APPLICATION

This application claims benefit of priority to Chinese Patent Application No. 202010343329.3 filed on Apr. 27, 2020 before the China National Intellectual Property Administration, the entire disclosure of which is incorporated herein by reference in its entity.

TECHNICAL FIELD

The present disclosure relates to the field of optical elements, and specifically, relates to an optical imaging lens assembly including five lenses and a double prism structure.

BACKGROUND

Recently, most mobile phones sold on the market are equipped with a 3+1 lens configuration including a large image plane lens assembly, a wide-angle lens assembly, a telephoto lens assembly and a TOF lens assembly. Most of the telephoto lens assemblies have 5×, 10×, or 15× optical zoom capabilities. If a conventional coaxial design is used, in order to meet the long focal length of the telephoto lens assembly, the total optical length (TTL) of the lens assembly will become longer, which may make the mobile phone unable to meet the ultra-thin characteristics. Therefore, an optical imaging lens assembly with a folding prism has emerged, which may effectively reduce the length of the mobile phone lens in the incident direction of the light.

Different from the optical imaging system with a single prism, the present disclosure relates to a optical imaging system with double prisms, which may ensure that the incident direction of the light is perpendicular to the imaging plane of the optical imaging lens assembly, and may shorten the lateral distance of the optical imaging lens assembly while maintaining a small longitudinal distance of the lens assembly, so that the mobile phone equipping with the optical imaging lens assembly according to the present disclosure has better application prospect.

SUMMARY

The present disclosure provides an optical imaging lens assembly, such as an optical imaging lens assembly with ultra-large field-of-view and ultra-thin characteristics, that is applicable to the portable electronic products and at least solves or partially solves at least one of the above disadvantages of the prior art.

In one aspect, the present disclosure provides an optical imaging lens assembly which includes, sequentially from an object side to an image side along an optical axis, a first lens having negative refractive power; a first prism including an incident surface, a reflecting surface and an exit surface, and an angle between the reflecting surface and the optical axis being 45°; a stop; a second lens having positive refractive power; a third lens having refractive power; a fourth lens having positive refractive power; a fifth lens having negative refractive power; and a second prism including an incident surface, a reflecting surface and an exit surface, and an angle between the reflecting surface and the optical axis being 45°.

In one embodiment, a total effective focal length f of the optical imaging lens assembly and a maximum field-of-view FOV of the optical imaging lens assembly may satisfy: $2.50 \text{ mm} < f \cdot \tan^2(FOV/2) < 4.00 \text{ mm}$.

In one embodiment, a combined focal length f23 of the second lens and the third lens and a combined focal length f34 of the third lens and the fourth lens may satisfy: $1.00 < f34/f23 < 2.50$.

In one embodiment, an effective focal length f1 of the first lens and an effective focal length f5 of the fifth lens may satisfy: $0.50 < f1/f5 < 2.00$.

In one embodiment, a combined focal length f345 of the third lens, the fourth lens, and the fifth lens and an effective focal length f5 of the fifth lens may satisfy: $-8.00 < f345/f5 < -2.00$.

In one embodiment, a radius of curvature R1 of an object-side surface of the first lens and a radius of curvature R2 of an image-side surface of the first lens may satisfy: $2.50 < (R1-R2)/(R1+R2) < 4.00$.

In one embodiment, a combined focal length f345 of the third lens, the fourth lens, and the fifth lens and a radius of curvature R10 of an image-side surface of the fifth lens may satisfy: $7.00 < f345/R10 < 12.00$.

In one embodiment, SAG11, being an on-axis distance from an intersection of an object-side surface of the first lens and the optical axis to a vertex of an effective radius of the object-side surface of the first lens, and SAG12, being an on-axis distance from an intersection of an image-side surface of the first lens and the optical axis to a vertex of an effective radius of the image-side surface of the first lens, may satisfy: $4.00 < SAG12/SAG11 < 5.50$.

In one embodiment, a center thickness CT4 of the fourth lens along the optical axis and an air interval T45 between the fourth lens and the fifth lens along the optical axis may satisfy: $24.00 < CT4/T45 < 52.00$.

In one embodiment, SAG22, being an on-axis distance from an intersection of an image-side surface of the second lens and the optical axis to a vertex of an effective radius of the image-side surface of the second lens, and SAG31, being an on-axis distance from an intersection of an object-side surface of the third lens and the optical axis to a vertex of an effective radius of the object-side surface of the third lens, may satisfy: $3.00 < SAG22/SAG31 < 9.00$.

In one embodiment, a maximum effective radius DT21 of an object-side surface of the second lens and a maximum effective radius DT22 of an image-side surface of the second lens may satisfy: $11.00 < (DT21+DT22)/(DT22-DT21) < 17.00$.

In one embodiment, a maximum field-of-view FOV of the optical imaging lens assembly may satisfy: $FOV > 88.0°$.

The optical imaging lens assembly provided by the present disclosure includes a plurality of lenses (for example, the first lens to the fifth lens) and two prisms (for example, the first prism and the second prism). By arranging two prisms, it is possible to ensure that the incident direction of the light is perpendicular to the imaging plane of the lens assembly, and the lateral distance and the longitudinal distance of the lens assembly may be effectively shortened. At the same time, by reasonably controlling the total effective focal length and the maximum field-of-view of the optical imaging lens assembly, and optimizing the refractive power and surface shape of each lens, it is beneficial to make the optical imaging lens assembly have a good light convergence ability and a large field-of-view, so that more camera modules applicable to the mobile phone may be designed using the return-back solution of the present disclosure.

BRIEF DESCRIPTION OF THE DRAWINGS

Other features, objects, and advantages of the present disclosure will become more apparent from the following detailed description of the non-limiting embodiments with reference to the accompanying drawings. In the drawings:

FIGS. 2A to 2C illustrate an astigmatic curve, a distortion curve and a relative illumination curve of the optical imaging lens assembly of the example 1, respectively;

FIGS. 8A to 8C illustrate an astigmatic curve, a distortion curve and a relative illumination curve of the optical imaging lens assembly of the example 4, respectively;

DETAILED DESCRIPTION OF EMBODIMENTS

Figure 1:
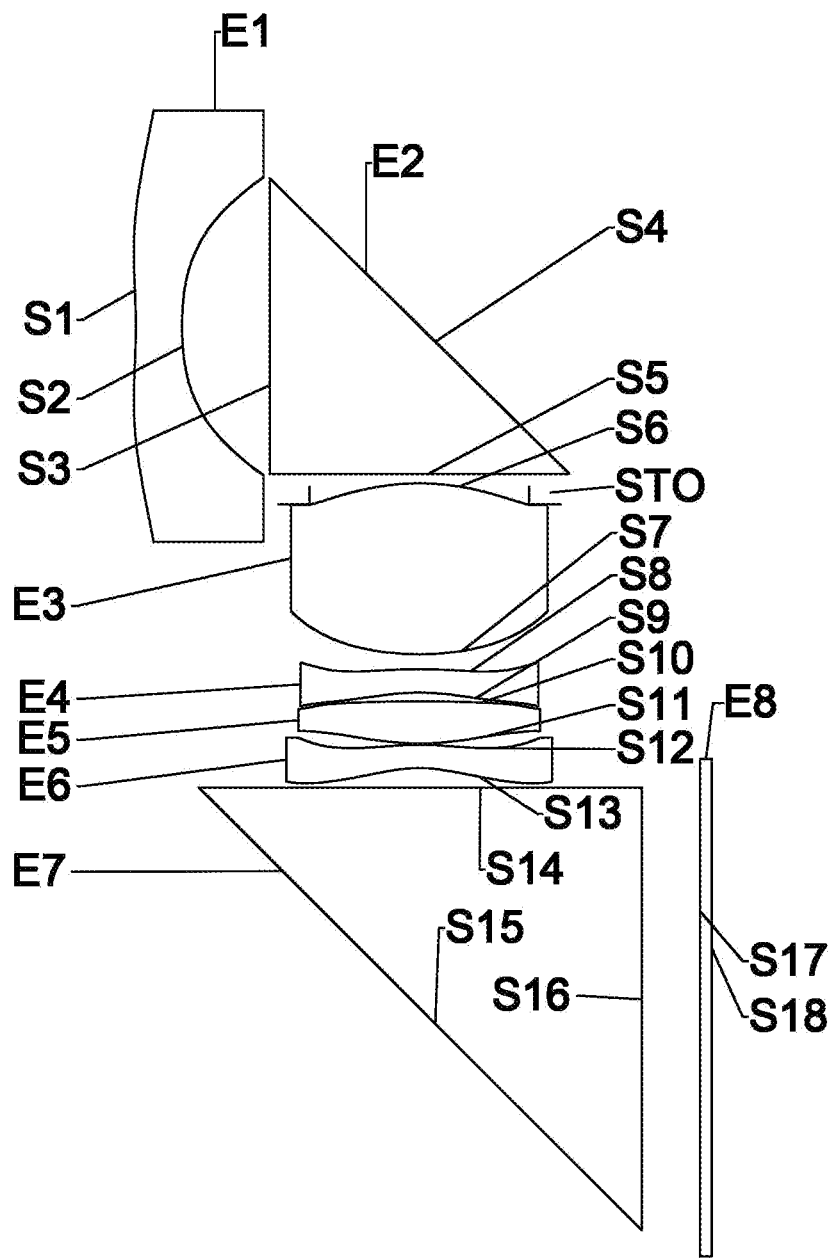
FIG. 1 illustrates a schematic structural view of an optical imaging lens assembly according to example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is convex and the position of the convex is not defined, it indicates that the surface of the lens is convex at least in the paraxial region; and if a surface of a lens is concave and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical imaging lens assembly according to an exemplary embodiment of the present disclosure may include, sequentially from an object side to an image side along an optical axis, a first lens, a first prism, a stop, a second lens, a third lens, a fourth lens, a fifth lens and a second prism. The first prism and the second prism are arranged such that the angle between their respective reflecting surface and the optical axis is 45°. There may be an air interval between each adjacent lens and between the prism and the lens.

The first prism and the second prism may be triangular prisms. The triangular prism includes an incident surface, a reflecting surface and an exit surface, and the incident surface and the exit surface are perpendicular to each other, such that the light incident perpendicular to the incident surface exits perpendicular to the exit surface after being changed by 90° by the reflecting surface. By using two prisms, it is possible to ensure that the incident direction of the light is perpendicular to the imaging plane of the optical imaging lens assembly, and the lateral distance (that is, the distance in the direction perpendicular to the imaging plane) of the optical imaging lens assembly may be effectively shortened while effectively avoiding the longitudinal distance (that is, the distance in the direction parallel to the imaging plane) being too long, so that the imaging lens assembly may be applicable to most portable devices.

In an exemplary embodiment, the first lens may have negative refractive power; the second lens may have positive refractive power; the third lens has positive or negative refractive power; the fourth lens may have positive refractive power; and the fifth lens may have negative refractive power. By reasonably configuring the refractive power and surface shape of each lens in the optical system, it is ensured that the optical imaging lens assembly has a reasonable structure, which may effectively broaden the maximum field-of-view of the optical imaging lens assembly, so that the optical system has a good light convergence ability.

In an exemplary embodiment, an object-side surface of the first lens may be a concave surface, and an image-side surface thereof may be a concave surface.

In an exemplary embodiment, an object-side surface of the second lens may be a convex surface, and an image-side surface thereof may be a convex surface.

In an exemplary embodiment, an object-side surface of the third lens may be a convex surface.

In an exemplary embodiment, an image-side surface of the fourth lens may be a convex surface.

In an exemplary embodiment, an image-side surface of the fifth lens may be a concave surface.

In an exemplary embodiment, a total effective focal length f of the optical imaging lens assembly and a maximum field-of-view FOV of the optical imaging lens assembly may satisfy: $2.50 \text{ mm} < f*\tan^2(\text{FOV}/2) < 4.00 \text{ mm}$. By reasonably controlling the total effective focal length of the optical imaging lens assembly and half of the maximum field-of-view of the optical imaging lens assembly, it is beneficial to control the imaging size and imaging range of the optical system, so that the system has a larger imaging plane.

In an exemplary embodiment, a combined focal length f23 of the second lens and the third lens and a combined focal length f34 of the third lens and the fourth lens may satisfy: $1.00 < f34/f23 < 2.50$. For example, $1.00 < f34/f23 < 2.10$. By controlling the ratio of the combined focal length of the second lens and the third lens to the combined focal length of the third lens and the fourth lens within a reasonable value range, it is possible to increase the maximum field-of-view of the optical imaging lens assembly while ensuring that the imaging lens assembly has a better light convergence ability. Meanwhile, it is possible to avoid problems such as increased sensitivity of the imaging lens assembly and processing difficulties due to excessive concentration of the refractive power.

In an exemplary embodiment, an effective focal length f1 of the first lens and an effective focal length f5 of the fifth lens may satisfy: $0.50 < f1/f5 < 2.00$. For example, $0.80 < f1/f5 < 1.70$. By satisfying the value range, the ratio of the effective focal length of the first lens to the effective focal length of the fifth lens is controlled within a reasonable value range, so that the optical imaging lens assembly has a better light convergence ability. At the same time, it may avoid the risk of difficulty in processing the fifth lens due to the excessive concentration of the refractive power.

In an exemplary embodiment, a combined focal length f345 of the third lens, the fourth lens, and the fifth lens and an effective focal length f5 of the fifth lens may satisfy: $-8.00 < f345/f5 < -2.00$. By controlling the ratio of the combined focal length of the third lens, the fourth lens, and the fifth lens to the effective focal length of the fifth lens within a reasonable value range, the optical imaging lens assembly may have a basic light converging ability. At the same time, it may avoid the risk of increased sensitivity of the imaging lens assembly due to the excessive concentration of the refractive power.

In an exemplary embodiment, a radius of curvature R1 of an object-side surface of the first lens and a radius of curvature R2 of an image-side surface of the first lens may satisfy: $2.50 < (R1-R2)/(R1+R2) < 4.00$. For example, $2.90 < (R1-R2)/(R1+R2) < 3.80$. By reasonably controlling the radii of curvature of the object-side surface and the image-side surface of the first lens, it is possible to increase the maximum field-of-view of the optical imaging lens assembly while keeping the prism small in size, thereby facilitating the reduction of the lateral size of the imaging lens assembly.

In an exemplary embodiment, a combined focal length f345 of the third lens, the fourth lens, and the fifth lens and a radius of curvature R10 of an image-side surface of the fifth lens may satisfy: $7.00 < f345/R10 < 12.00$. By controlling the ratio of the combined focal length of the third lens, the fourth lens, and the fifth lens to the radius of curvature of the image-side surface of the fifth lens within a reasonable value range, the optical imaging lens assembly may have the basic light converging ability, so as to avoid the risk of difficulty in processing the imaging lens assembly due to the absolute value of the radius of curvature of the image-side surface of the fifth lens being too small. At the same time, it may effectively reduce the energy intensity of the ghost image generated by the reflection between the fourth lens and the fifth lens.

In an exemplary embodiment, an on-axis distance SAG11 from an intersection of an object-side surface of the first lens and the optical axis to a vertex of an effective radius of the object-side surface of the first lens and an on-axis distance SAG12 from an intersection of an image-side surface of the first lens and the optical axis to a vertex of an effective radius of the image-side surface of the first lens may satisfy: $4.00 < SAG12/SAG11 < 5.50$. For example, $4.20 < SAG12/SAG11 < 5.10$. By controlling the ratio of the vector heights of the object-side surface to the image-side surface of the first lens within a reasonable value range, it is beneficial to increase the maximum field-of-view of the optical imaging lens assembly while avoiding the situation that the size of the prism in the optical system is too large due to the excessively large vector height of the object side or image side of the first lens, which is not conducive to shortening the lateral distance of the imaging lens. At the same time, it may also avoid the situation that the maximum field-of-view of the optical imaging lens assembly cannot be effectively increased due to the sagittal height of the object-side surface or the image-side surface of the first lens being too small, and avoid the situation that the increased sensitivity of the first lens makes the processing of the imaging lens assembly difficult.

In an exemplary embodiment, a center thickness CT4 of the fourth lens along the optical axis and an air interval T45 between the fourth lens and the fifth lens along the optical axis may satisfy: $24.00 < CT4/T45 < 52.00$. By controlling the ratio of the center thickness of the fourth lens along the optical axis to the air interval between the fourth lens and the fifth lens along the optical axis within a reasonable value range, the energy intensity of the ghost images caused by the reflection of the object-side surface and the image-side surface of the fourth lens and the reflection between the fourth lens and the fifth lens may be effectively reduced, thereby effectively improving the overall image quality of the optical imaging lens assembly.

In an exemplary embodiment, an on-axis distance SAG22 from an intersection of an image-side surface of the second lens and the optical axis to a vertex of an effective radius of the image-side surface of the second lens and an on-axis distance SAG31 from an intersection of an object-side surface of the third lens and the optical axis to a vertex of an effective radius of the object-side surface of the third lens may satisfy: 3.00<SAG22/SAG31<9.00. By controlling the ratio of the vector height of the image-side surface of the second lens to the vector height of the object-side surface of the third lens within a reasonable value range, it is beneficial to increase the maximum field-of-view of the optical imaging lens assembly and improve the aberration correction capability of the imaging lens assembly while avoiding the risk of processing difficulties caused by excessive bending of the edge of the lens.

In an exemplary embodiment, a maximum effective radius DT21 of an object-side surface of the second lens and a maximum effective radius DT22 of an image-side surface of the second lens may satisfy: 11.00<(DT21+DT22)/(DT22−DT21)<17.00. By reasonably controlling the maximum effective radii of the object-side surface and the image-side surface of the second lens, and by cooperating the second lens with the first lens, it is possible to increase the maximum field-of-view of the optical imaging lens assembly while reducing the eccentricity of the second lens and the sensitivity of the radius of curvature, thereby improving the processing performance of the second lens.

In an exemplary embodiment, a maximum field-of-view FOV of the optical imaging lens assembly may satisfy: FOV>88.0°. For example, 88.0°<FOV<110.0°. By increasing the maximum field-of-view of the optical imaging lens assembly, it is possible to configure more types of mobile phone camera modules on the mobile phone, which greatly expands the application range of the dual-prism optical imaging lens assembly. At the same time, it also provides the possibility to further shorten the size of the mobile phone.

In an exemplary embodiment, the above optical imaging lens assembly may further include a stop. The stop may be disposed at an appropriate position as required. For example, the stop may be disposed between the first prism and the second lens. Optionally, the above optical imaging lens assembly may further include an optical filter for correcting the color deviation and/or a protective glass for protecting the photosensitive element located on an imaging plane.

The present disclosure proposes an optical imaging lens assembly with the characteristics of ultra-large field-of-view and ultra-thinness. The optical imaging lens assembly according to the above embodiments of the present disclosure may employ a plurality of lenses, such as five lenses as described above. By properly configuring the refractive power of each lens, the surface shape, the effective focal length and radius of curvature of each lens, the incident light may be effectively converged, the maximum field-of-view of the optical imaging lens assembly may be broadened, and the workability of the imaging lens assembly may be improved, such that the optical imaging lens assembly is more advantageous for production processing. In addition, the optical imaging lens assembly according to the present disclosure adopts a double prism structure, which may effectively shorten the lateral distance of the lens assembly while maintaining a small longitudinal distance of the lens assembly.

In an exemplary embodiment, at least one of the surfaces of lenses is aspheric, that is, at least one of the object-side surface of the first lens to the image-side surface of the fifth lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, at least one of the object-side surface and the image-side surface of each of the first lens, the second lens, the third lens, the fourth lens and the fifth lens is aspheric. Optionally, the object-side surface and the image-side surface of each of the first lens, the second lens, the third lens, the fourth lens and the fifth lens are aspheric.

The present disclosure further provides an imaging apparatus, having an electronic photosensitive element which may be a photosensitive Charge-Coupled Device (CCD) or a Complementary Metal-Oxide Semiconductor (CMOS). The imaging apparatus may be an independent imaging device, such as a digital camera, or may be an imaging module integrated in a mobile electronic device, such as a mobile phone. The imaging apparatus is equipped with the optical imaging lens assembly described above.

However, it will be understood by those skilled in the art that the number of lenses constituting the optical imaging lens assembly may be varied to achieve the various results and advantages described in this specification without departing from the technical solution claimed by the present disclosure. For example, although the embodiment is described by taking five lenses as an example, the optical imaging lens assembly is not limited to include five lenses. The optical imaging lens assembly may also include other numbers of lenses if desired.

Some specific examples of an optical imaging lens assembly applicable to the above embodiment will be further described below with reference to the accompanying drawings.

Example 1

An optical imaging lens assembly according to example 1 of the present disclosure is described below with reference to FIG. 1 to FIG. 2C. FIG. 1 is a schematic structural view of the optical imaging lens assembly according to example 1 of the present disclosure.

As shown in FIG. 1, the optical imaging lens assembly includes a first lens E1, a first prism E2, a stop STO, a second lens E3, a third lens E4, a fourth lens E5, a fifth lens E6, a second prism E7 and an optical filter E8, which are sequentially arranged from an object side to an image side along an optical axis.

The first lens E1 has negative refractive power, an object-side surface S1 thereof is concave, and an image-side surface S2 thereof is concave. An incident surface S3, a reflecting surface S4 and an exit surface S5 of the first prism E2 are spherical. The reflecting surface S4 is at 45° with the optical axis, so that the light incident perpendicular to the incident surface S3 of the first prism E2 is deflected by 90° by the reflecting surface S4 and then exits from the first prism E2 perpendicular to the exit surface S5. The second lens E3 has positive refractive power, an object-side surface S6 thereof is convex, and an image-side surface S7 thereof is convex. The third lens E4 has negative refractive power, an object-side surface S8 thereof is convex, and an image-side surface S9 thereof is concave. The fourth lens E5 has positive refractive power, an object-side surface S10 thereof is convex, and an image-side surface S11 thereof is convex. The fifth lens E6 has negative refractive power, an object-side surface S12 thereof is convex, and an image-side surface S13 thereof is concave. An incident surface S14, a reflecting surface S15 and an exit surface S16 of the second prism E7 are spherical. The reflecting surface S15 is at 45° with the optical axis, so that the light incident perpendicular to the incident surface S14 of the second prism E7 is deflected by 90° by the reflecting surface S15 and then exits from the second prism E7 perpendicular to the exit surface S16. The optical filter E8 has an object-side surface S17 and an image-side surface S18. Light from an object sequentially passes through the respective surfaces S1 to S18 and is finally imaged on an imaging plane S19 (not shown).

Table 1 is a table illustrating basic parameters of the optical imaging lens assembly of example 1, wherein the units for the radius of curvature, the thickness/distance and the focal length are millimeter (mm).

TABLE 1

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | −5.0411 | 0.4324 | 1.55 | 56.1 | −3.30 | 4.7488 |
| S2 | Aspheric | 2.8944 | 0.8272 | | | | −3.4830 |
| S3 | Spherical | Infinite | 1.4100 | 1.52 | 64.2 | | |
| S4 | Spherical | Infinite | −1.4100 | 1.52 | 64.2 | | |
| S5 | Spherical | Infinite | −0.2713 | | | | |
| STO | Spherical | Infinite | −0.1982 | | | | |
| S6 | Aspheric | 2.3629 | 1.6117 | 1.55 | 56.1 | 2.58 | 1.3252 |
| S7 | Aspheric | −2.6356 | 0.1357 | | | | 0.2975 |
| S8 | Aspheric | 4.5203 | 0.2200 | 1.67 | 20.4 | −6.81 | 0.0000 |
| S9 | Aspheric | 2.2216 | 0.0871 | | | | −8.6081 |
| S10 | Aspheric | 24.0655 | 0.3999 | 1.55 | 56.1 | 3.49 | −99.0000 |
| S11 | Aspheric | −2.0556 | 0.0163 | | | | −1.1784 |
| S12 | Aspheric | 3.0165 | 0.2200 | 1.67 | 20.4 | −3.98 | −1.3401 |
| S13 | Aspheric | 1.3716 | 0.1600 | | | | −8.9159 |
| S14 | Spherical | Infinite | 2.1000 | 1.52 | 64.2 | | |
| S15 | Spherical | Infinite | 2.1000 | 1.52 | 64.2 | | |
| S16 | Spherical | Infinite | 0.5508 | | | | |
| S17 | Spherical | Infinite | 0.1100 | 1.52 | 64.2 | | |
| S18 | Spherical | Infinite | 0.1200 | | | | |
| S19 | Spherical | Infinite | | | | | |

In this example, a total effective focal length f of the optical imaging lens assembly satisfies f=2.74 mm, half of a diagonal length ImgH of an effective pixel area on the imaging plane S19 satisfies ImgH=2.40 mm, half of a maximum field-of-view Semi-FOV of the optical imaging lens assembly satisfies Semi-FOV=44.1°, and an aperture value Fno of the optical imaging lens assembly satisfies Fno=2.65.

In example 1, the object-side surface and the image-side surface of any one of the first lens E1 to the fifth lens E6 are aspheric. The surface shape x of each aspheric lens may be defined by using, but not limited to, the following aspheric formula:

$$x = \frac{ch^2}{1+\sqrt{1-(k+1)c^2h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2 below shows high-order coefficients A4, A6, A8, A10, A12, A14, A16, A18 and A20 applicable to each aspheric surface in example 1.

TABLE 2

| Surface number | A4 | A6 | A8 | A10 | A12 |
|---|---|---|---|---|---|
| S1 | 1.8065E−01 | −1.4662E−01 | 9.0896E−02 | −1.7279E−02 | −3.4361E−02 |
| S2 | 2.1843E−01 | −5.1008E−02 | −2.9432E−01 | 9.8930E−01 | −1.7838E+00 |
| S6 | 3.0060E−02 | −1.9436E−01 | 2.2486E+00 | −1.4441E+01 | 5.9736E+01 |
| S7 | 7.7728E−03 | −7.8478E−02 | 9.6899E−01 | −4.2961E+00 | 1.2564E+01 |
| S8 | 1.9606E−01 | −9.1765E−01 | 6.8116E+00 | −3.1758E+01 | 9.8168E+01 |

TABLE 2-continued

| | | | | | |
|---|---|---|---|---|---|
| S9 | 1.6665E−01 | −1.7922E+00 | 1.4406E+01 | −6.2798E+01 | 1.7301E+02 |
| S10 | −2.4534E−02 | −1.3556E+00 | 1.3248E+01 | −5.5461E+01 | 1.3574E+02 |
| S11 | −6.8295E−01 | 4.6156E+00 | −2.3695E+01 | 8.9565E+01 | −2.5421E+02 |
| S12 | −1.1963E−02 | 3.1948E+00 | −1.9033E+01 | 6.9874E+01 | −1.8285E+02 |
| S13 | 1.4098E−01 | 7.0696E−02 | −1.2147E+00 | 4.1803E+00 | −8.8103E+00 |

| Surface number | A14 | A16 | A18 | A20 |
|---|---|---|---|---|
| S1 | 4.3180E−02 | −2.6809E−02 | 1.0445E−02 | −2.6521E−03 |
| S2 | 2.1330E+00 | −1.7745E+00 | 1.0355E+00 | −4.1731E−01 |
| S6 | −1.6539E+02 | 3.1294E+02 | −4.0574E+02 | 3.5445E+02 |
| S7 | −2.5120E+01 | 3.4502E+01 | −3.2476E+01 | 2.0574E+01 |
| S8 | −2.0534E+02 | 2.9562E+02 | −2.9344E+02 | 1.9687E+02 |
| S9 | −3.2627E+02 | 4.3682E+02 | −4.1681E+02 | 2.7645E+02 |
| S10 | −2.2123E+02 | 2.5870E+02 | −2.2601E+02 | 1.4712E+02 |
| S11 | 5.3133E+02 | −7.9772E+02 | 8.4022E+02 | −6.0237E+02 |
| S12 | 3.5222E+02 | −4.9517E+02 | 4.9654E+02 | −3.4343E+02 |
| S13 | 1.3554E+01 | −1.5811E+01 | 1.3626E+01 | −8.2444E+00 |

FIG. 2A illustrates the astigmatic curves of the optical imaging lens assembly according to example 1, representing the curvatures of a tangential plane and the curvatures of a sagittal plane. FIG. 2B illustrates a distortion curve of the optical imaging lens assembly according to example 1, representing the amounts of distortion corresponding to different image heights. FIG. 2C illustrates a relative illumination curve of the optical imaging lens assembly according to example 1, representing the relative illumination values corresponding to different image heights. It can be seen from FIG. 2A to FIG. 2C that the optical imaging lens assembly provided in example 1 may achieve good image quality.

Example 2

Figure 3:
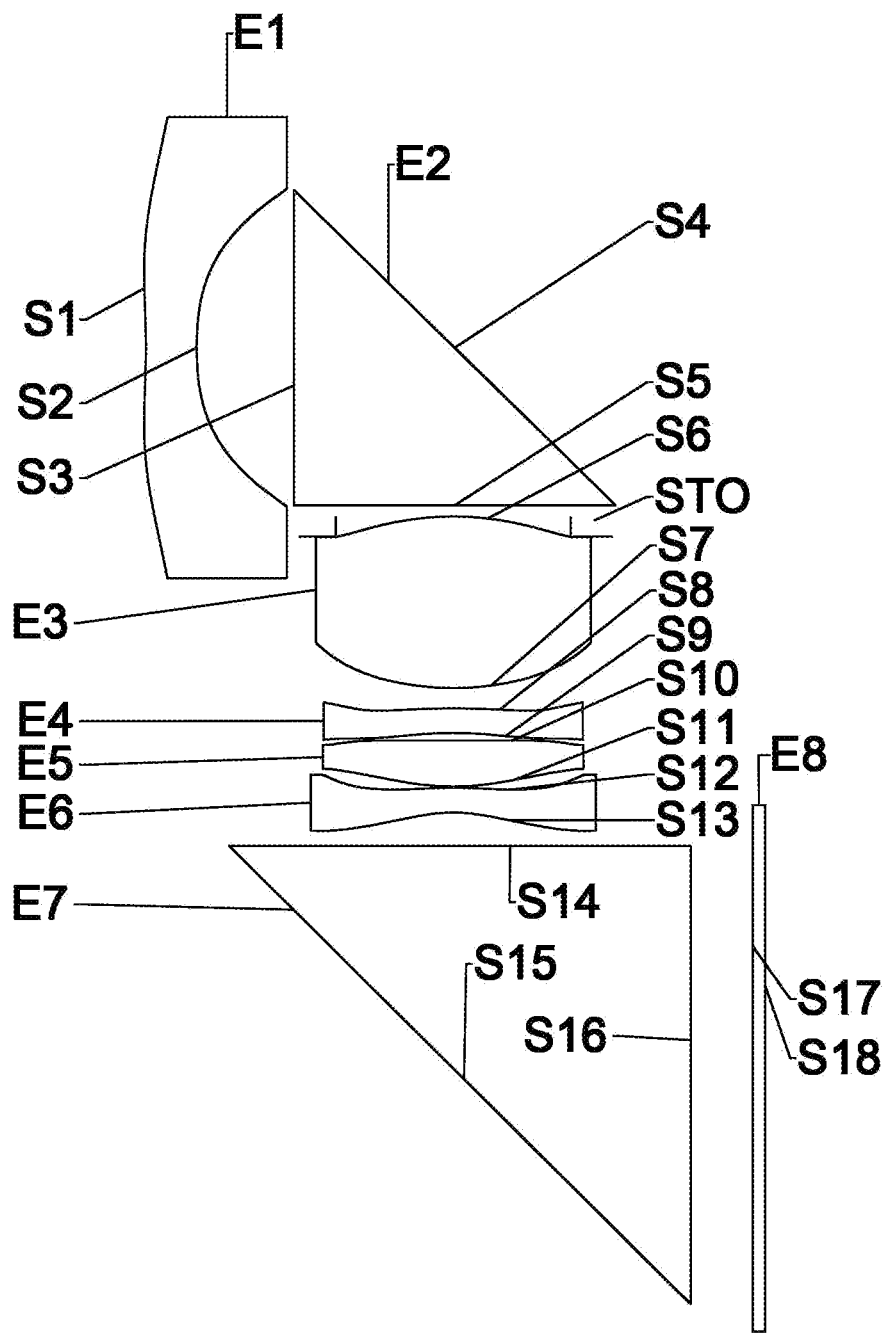
FIG. 3 illustrates a schematic structural view of an optical imaging lens assembly according to example 2 of the present disclosure.

An optical imaging lens assembly according to example 2 of the present disclosure is described below with reference to FIG. 3 to FIG. 4C. FIG. 3 is a schematic structural view of the optical imaging lens assembly according to example 2 of the present disclosure.

As shown in FIG. 3, the optical imaging lens assembly includes a first lens E1, a first prism E2, a stop STO, a second lens E3, a third lens E4, a fourth lens E5, a fifth lens E6, a second prism E7 and an optical filter E8, which are sequentially arranged from an object side to an image side along an optical axis.

The first lens E1 has negative refractive power, an object-side surface S1 thereof is concave, and an image-side surface S2 thereof is concave. An incident surface S3, a reflecting surface S4 and an exit surface S5 of the first prism E2 are spherical. The reflecting surface S4 is at 45° with the optical axis, so that the light incident perpendicular to the incident surface S3 of the first prism E2 is deflected by 90° by the reflecting surface S4 and then exits from the first prism E2 perpendicular to the exit surface S5. The second lens E3 has positive refractive power, an object-side surface S6 thereof is convex, and an image-side surface S7 thereof is convex. The third lens E4 has negative refractive power, an object-side surface S8 thereof is convex, and an image-side surface S9 thereof is concave. The fourth lens E5 has positive refractive power, an object-side surface S10 thereof is concave, and an image-side surface S11 thereof is convex. The fifth lens E6 has negative refractive power, an object-side surface S12 thereof is convex, and an image-side surface S13 thereof is concave. An incident surface S14, a reflecting surface S15 and an exit surface S16 of the second prism E7 are spherical. The reflecting surface S15 is at 45° with the optical axis, so that the light incident perpendicular to the incident surface S14 of the second prism E7 is deflected by 90° by the reflecting surface S15 and then exits from the second prism E7 perpendicular to the exit surface S16. The optical filter E8 has an object-side surface S17 and an image-side surface S18. Light from an object sequentially passes through the respective surfaces S1 to S18 and is finally imaged on an imaging plane S19 (not shown).

In this example, a total effective focal length f of the optical imaging lens assembly satisfies f=2.74 mm, half of a diagonal length ImgH of an effective pixel area on the imaging plane S19 satisfies ImgH=2.40 mm, half of a maximum field-of-view Semi-FOV of the optical imaging lens assembly satisfies Semi-FOV=44.1°, and an aperture value Fno of the optical imaging lens assembly satisfies Fno=2.65.

Table 3 is a table illustrating basic parameters of the optical imaging lens assembly of example 2, wherein the units for the radius of curvature, the thickness/distance and the focal length are millimeter (mm).

TABLE 3

| | | | | Material | | | |
|---|---|---|---|---|---|---|---|
| Surface number | Surface type | Radius of curvature | Thickness/ Distance | Refractive index | Abbe number | Focal length | Conic coefficient |
| OBJ | Spherical | Infinite | Infinite | | | | |
| S1 | Aspheric | −5.0708 | 0.4477 | 1.55 | 56.1 | −3.35 | 4.6836 |
| S2 | Aspheric | 2.9466 | 0.8603 | | | | −2.8238 |
| S3 | Spherical | Infinite | 1.4100 | 1.52 | 64.2 | | |
| S4 | Spherical | Infinite | −1.4100 | 1.52 | 64.2 | | |
| S5 | Spherical | Infinite | −0.2713 | | | | |
| STO | Spherical | Infinite | −0.1785 | | | | |

TABLE 3-continued

| Surface number | Surface type | Radius of curvature | Thickness/ Distance | Material Refractive index | Abbe number | Focal length | Conic coefficient |
|---|---|---|---|---|---|---|---|
| S6 | Aspheric | 2.5660 | 1.5296 | 1.55 | 56.1 | 2.64 | 1.4521 |
| S7 | Aspheric | −2.5896 | 0.1793 | | | | −0.0108 |
| S8 | Aspheric | 4.9956 | 0.2200 | 1.67 | 20.4 | −13.73 | −36.1313 |
| S9 | Aspheric | 3.1759 | 0.0688 | | | | −13.1115 |
| S10 | Aspheric | −111.0597 | 0.4096 | 1.55 | 56.1 | 3.52 | −99.0000 |
| S11 | Aspheric | −1.8935 | 0.0100 | | | | −1.0439 |
| S12 | Aspheric | 3.9884 | 0.2200 | 1.67 | 20.4 | −3.14 | −0.7812 |
| S13 | Aspheric | 1.3432 | 0.1800 | | | | −8.4696 |
| S14 | Spherical | Infinite | 2.1000 | 1.52 | 64.2 | | |
| S15 | Spherical | Infinite | 2.1000 | 1.52 | 64.2 | | |
| S16 | Spherical | Infinite | 0.5496 | | | | |
| S17 | Spherical | Infinite | 0.1100 | 1.52 | 64.2 | | |
| S18 | Spherical | Infinite | 0.1229 | | | | |
| S19 | Spherical | Infinite | | | | | |

In example 2, the object-side surface and the image-side surface of any one of the first lens E1 to the fifth lens E6 are aspheric. Table 4 below shows high-order coefficients A4, A6, A8, A10, A12, A14, A16, A18 and A20 applicable to each aspheric surface in example 2, wherein the surface shape of each aspheric surface may be defined by the formula (1) given in the above example 1.

TABLE 4

| Surface number | A4 | A6 | A8 | A10 | A12 |
|---|---|---|---|---|---|
| S1 | 1.8241E−01 | −1.3638E−01 | 6.7667E−02 | 8.9226E−03 | −5.1761E−02 |
| S2 | 2.2127E−01 | −6.7914E−02 | −7.4345E−02 | 1.8776E−02 | 6.2129E−01 |
| S6 | 2.5879E−02 | −1.6526E−01 | 2.0065E+00 | −1.3330E+01 | 5.6608E+01 |
| S7 | 1.1458E−02 | 2.0157E−02 | −8.6361E−02 | 5.2771E−01 | −1.2771E+00 |
| S8 | 1.0120E−01 | −4.0105E−01 | 3.9741E+00 | −2.3100E+01 | 8.4342E+01 |
| S9 | 1.0023E−01 | −1.6231E+00 | 1.9379E+01 | −1.1016E+02 | 3.7820E+02 |
| S10 | −5.4466E−02 | −1.8562E+00 | 2.5201E+01 | −1.4419E+02 | 4.9050E+02 |
| S11 | −8.5228E−02 | 7.2545E+00 | −4.0956E+01 | 1.5454E+02 | −4.1073E+02 |
| S12 | −1.4315E−01 | 5.4335E+00 | −3.5436E+01 | 1.3941E+02 | −3.7492E+02 |
| S13 | 1.5025E−01 | 1.3339E−02 | −1.3622E+00 | 5.3872E+00 | −1.1709E+01 |

| Surface number | A14 | A16 | A18 | A20 |
|---|---|---|---|---|
| S1 | 4.9525E−02 | −2.7372E−02 | 9.8657E−03 | −2.3560E−03 |
| S2 | −1.6681E+00 | 2.2487E+00 | −1.8567E+00 | 9.7813E−01 |
| S6 | −1.5977E+02 | 3.0638E+02 | −4.0077E+02 | 3.5200E+02 |
| S7 | 1.7263E+00 | −1.4399E+00 | 7.7228E−01 | −2.8988E−01 |
| S8 | −2.0026E+02 | 3.1860E+02 | −3.4244E+02 | 2.4489E+02 |
| S9 | −8.5471E+02 | 1.3157E+03 | −1.3885E+03 | 9.8807E+02 |
| S10 | −1.1010E+03 | 1.6932E+03 | −1.7961E+03 | 1.2922E+03 |
| S11 | 7.8431E+02 | −1.0758E+03 | 1.0444E+03 | −6.9692E+02 |
| S12 | 7.1852E+02 | −9.8942E+02 | 9.6828E+02 | −6.5477E+02 |
| S13 | 1.6872E+01 | −1.7243E+01 | 1.2807E+01 | −6.8584E+00 |

Figure 4A:
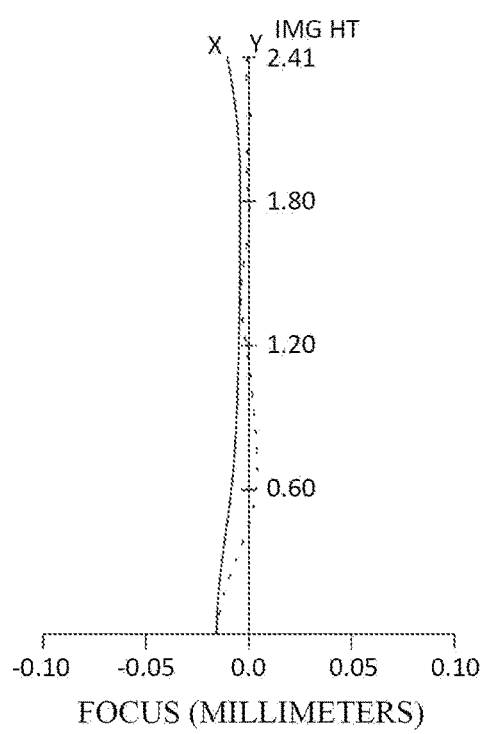
FIGS. 4A to 4C illustrate an astigmatic curve, a distortion curve and a relative illumination curve of the optical imaging lens assembly of the example 2, respectively.
Figure 4B:
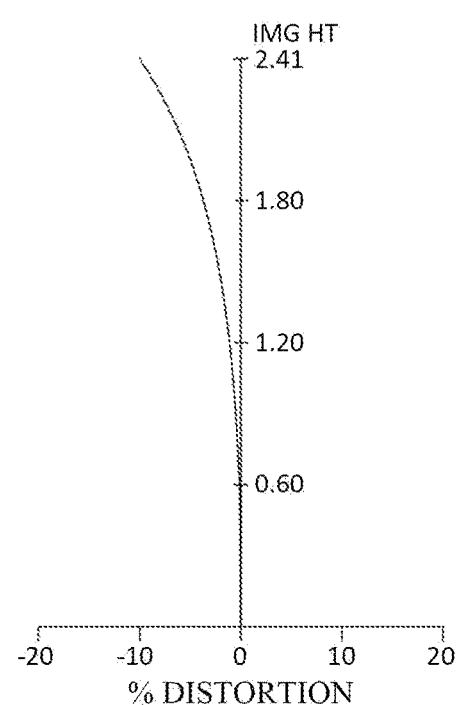
Figure 4C:
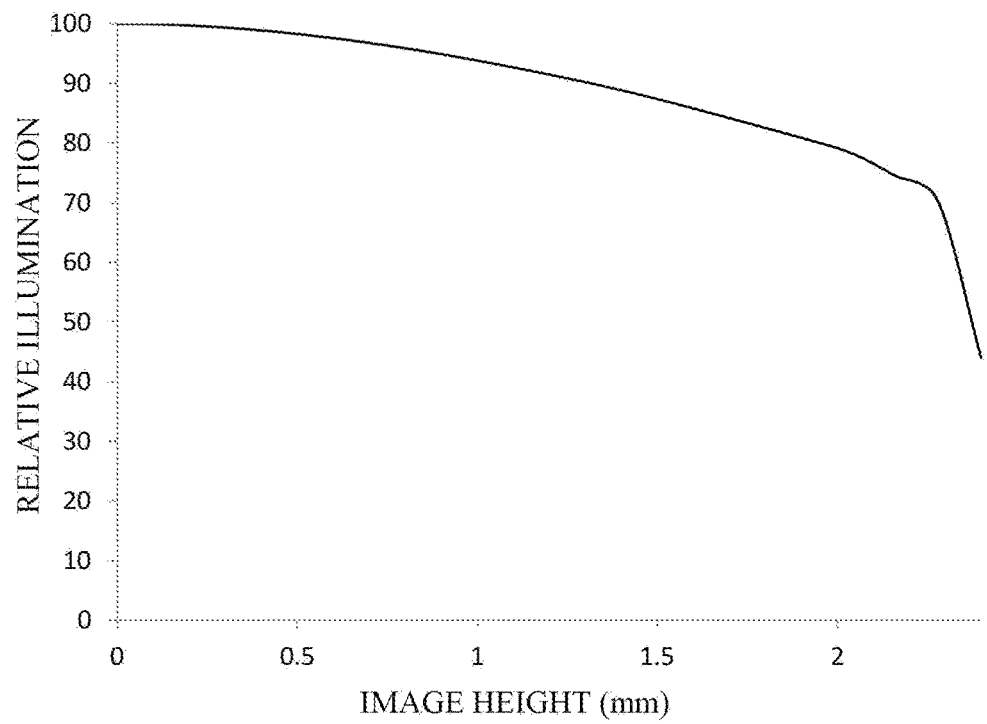

FIG. 4A illustrates the astigmatic curves of the optical imaging lens assembly according to example 2, representing the curvatures of a tangential plane and the curvatures of a sagittal plane. FIG. 4B illustrates a distortion curve of the optical imaging lens assembly according to example 2, representing the amounts of distortion corresponding to different image heights. FIG. 4C illustrates a relative illumination curve of the optical imaging lens assembly according to example 2, representing the relative illumination values corresponding to different image heights. It can be seen from FIG. 4A to FIG. 4C that the optical imaging lens assembly provided in example 2 may achieve good image quality.

Example 3

Figure 5:
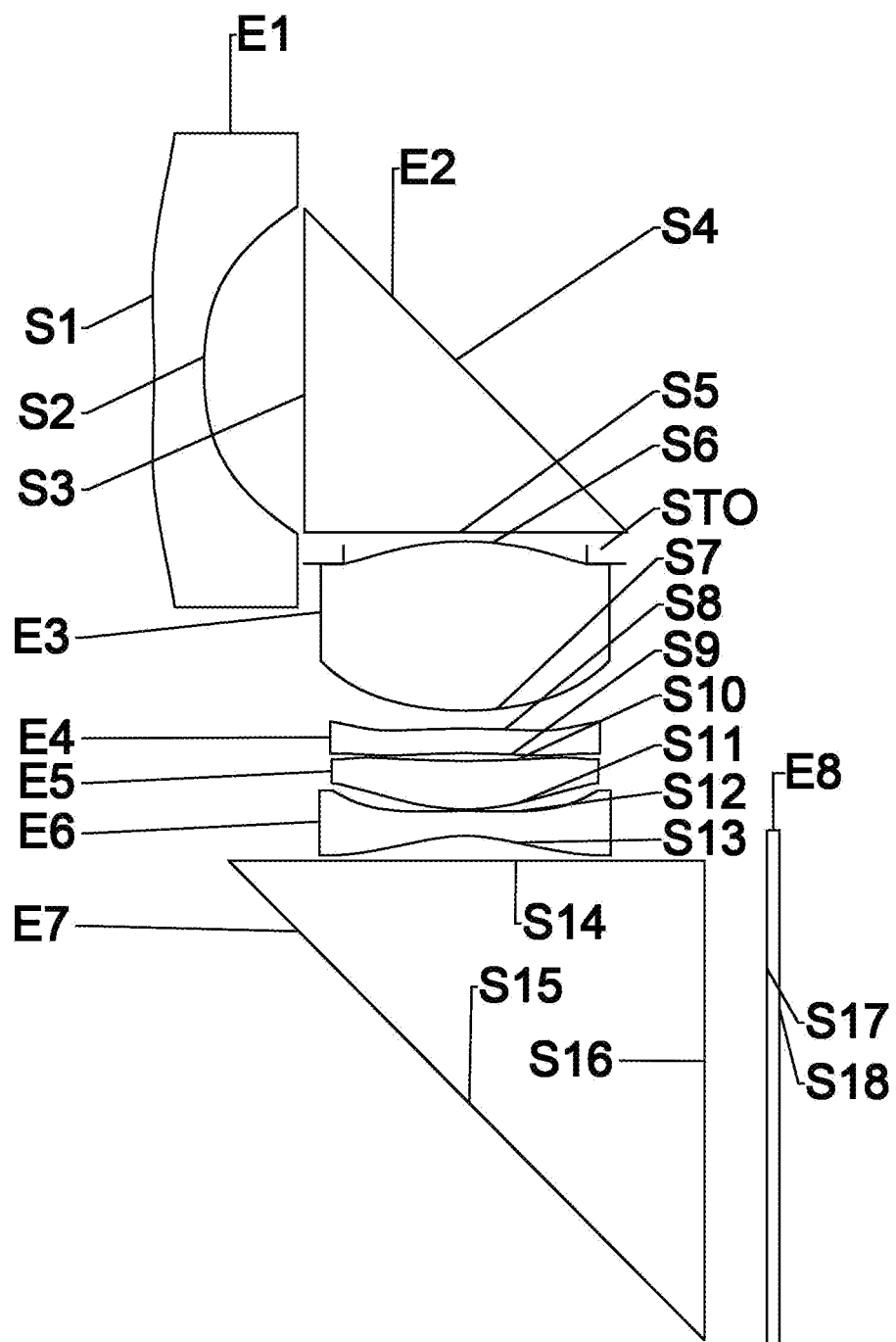
FIG. 5 illustrates a schematic structural view of an optical imaging lens assembly according to example 3 of the present disclosure.

An optical imaging lens assembly according to example 3 of the present disclosure is described below with reference to FIG. 5 to FIG. 6C. FIG. 5 is a schematic structural view of the optical imaging lens assembly according to example 3 of the present disclosure.

As shown in FIG. 5, the optical imaging lens assembly includes a first lens E1, a first prism E2, a stop STO, a second lens E3, a third lens E4, a fourth lens E5, a fifth lens E6, a second prism E7 and an optical filter E8, which are sequentially arranged from an object side to an image side along an optical axis.

The first lens E1 has negative refractive power, an object-side surface S1 thereof is concave, and an image-side surface S2 thereof is concave. An incident surface S3, a reflecting surface S4 and an exit surface S5 of the first prism E2 are spherical. The reflecting surface S4 is at 45° with the optical axis, so that the light incident perpendicular to the incident surface S3 of the first prism E2 is deflected by 90° by the reflecting surface S4 and then exits from the first prism E2 perpendicular to the exit surface S5. The second lens E3 has positive refractive power, an object-side surface S6 thereof is convex, and an image-side surface S7 thereof is convex. The third lens E4 has positive refractive power, an object-side surface S8 thereof is convex, and an image-side surface S9 thereof is concave. The fourth lens E5 has positive refractive power, an object-side surface S10 thereof is concave, and an image-side surface S11 thereof is convex. The fifth lens E6 has negative refractive power, an object-side surface S12 thereof is convex, and an image-side surface S13 thereof is concave. An incident surface S14, a reflecting surface S15 and an exit surface S16 of the second prism E7 are spherical. The reflecting surface S15 is at 45° with the optical axis, so that the light incident perpendicular to the incident surface S14 of the second prism E7 is deflected by 90° by the reflecting surface S15 and then exits from the second prism E7 perpendicular to the exit surface S16. The optical filter E8 has an object-side surface S17 and an image-side surface S18. Light from an object sequentially passes through the respective surfaces S1 to S18 and is finally imaged on an imaging plane S19 (not shown).

In this example, a total effective focal length f of the optical imaging lens assembly satisfies f=2.75 mm, half of a diagonal length ImgH of an effective pixel area on the imaging plane S19 satisfies ImgH=2.40 mm, half of a maximum field-of-view Semi-FOV of the optical imaging lens assembly satisfies Semi-FOV=44.6°, and an aperture value Fno of the optical imaging lens assembly satisfies Fno=2.60.

Table 5 is a table illustrating basic parameters of the optical imaging lens assembly of example 3, wherein the units for the radius of curvature, the thickness and the focal length are millimeter (mm).

TABLE 5

| Surface number | Surface type | Radius of curvature | Thickness/ Distance | Refractive index | Abbe number | Focal length | Conic coefficient |
|---|---|---|---|---|---|---|---|
| OBJ | Spherical | Infinite | Infinite | | | | |
| S1 | Aspheric | −5.0782 | 0.4349 | 1.55 | 56.1 | −3.34 | 4.6636 |
| S2 | Aspheric | 2.9328 | 0.8791 | | | | −2.7857 |
| S3 | Spherical | Infinite | 1.4100 | 1.52 | 64.2 | | |
| S4 | Spherical | Infinite | −1.4100 | 1.52 | 64.2 | | |
| S5 | Spherical | Infinite | −0.2713 | | | | |
| STO | Spherical | Infinite | −0.1917 | | | | |
| S6 | Aspheric | 2.5472 | 1.4733 | 1.55 | 56.1 | 2.66 | 1.5475 |
| S7 | Aspheric | −2.6866 | 0.1536 | | | | −0.0535 |
| S8 | Aspheric | 5.5657 | 0.2158 | 1.67 | 20.4 | 321.48 | −34.8761 |
| S9 | Aspheric | 5.6253 | 0.0681 | | | | −13.8385 |
| S10 | Aspheric | −8.1203 | 0.4233 | 1.55 | 56.1 | 3.57 | −83.7013 |
| S11 | Aspheric | −1.6008 | 0.0103 | | | | −0.9924 |
| S12 | Aspheric | 6.1154 | 0.2190 | 1.67 | 20.4 | −2.60 | −0.1745 |
| S13 | Aspheric | 1.3304 | 0.1900 | | | | −8.5975 |
| S14 | Spherical | Infinite | 2.1000 | 1.52 | 64.2 | | |
| S15 | Spherical | Infinite | 2.1000 | 1.52 | 64.2 | | |
| S16 | Spherical | Infinite | 0.5478 | | | | |
| S17 | Spherical | Infinite | 0.1100 | 1.52 | 64.2 | | |
| S18 | Spherical | Infinite | 0.1370 | | | | |
| S19 | Spherical | Infinite | | | | | |

In example 3, the object-side surface and the image-side surface of any one of the first lens E1 to the fifth lens E6 are aspheric. Table 6 below shows high-order coefficients A4, A6, A8, A10, A12, A14, A16, A18 and A20 applicable to each aspheric surface in example 3, wherein the surface shape of each aspheric surface may be defined by the formula (1) given in the above example 1.

TABLE 6

| Surface number | A4 | A6 | A8 | A10 | A12 |
|---|---|---|---|---|---|
| S1 | 1.8414E−01 | −1.3365E−01 | 5.4048E−02 | 3.1475E−02 | −7.4351E−02 |
| S2 | 2.1974E−01 | −1.7385E−02 | −3.3658E−01 | 8.3663E−01 | −1.0799E+00 |
| S6 | 2.7357E−02 | −2.0706E−01 | 2.3052E+00 | −1.4327E+01 | 5.6956E+01 |
| S7 | 2.3269E−02 | −3.2665E−02 | 3.0415E−01 | −1.7031E+00 | 6.0940E+00 |
| S8 | 1.0833E−01 | −6.7890E−01 | 6.9174E+00 | −3.7948E+01 | 1.2807E+02 |
| S9 | 1.2147E−01 | −2.3977E+00 | 2.5629E+01 | −1.3383E+02 | 4.2348E+02 |
| S10 | −1.1455E−03 | −2.7110E+00 | 3.0879E+01 | −1.6286E+02 | 5.1717E+02 |
| S11 | −8.5655E−01 | 7.1974E+00 | −3.9649E+01 | 1.4498E+02 | −3.7147E+02 |
| S12 | −1.4402E−01 | 5.5272E+00 | −3.5611E+01 | 1.3681E+02 | −3.5706E+02 |
| S13 | 1.5788E−01 | 5.6600E−02 | −1.9083E+00 | 7.6551E+00 | −1.7154E+01 |

TABLE 6-continued

| Surface number | A14 | A16 | A18 | A20 |
|---|---|---|---|---|
| S1 | 6.4593E−02 | −3.4264E−02 | 1.2034E−02 | −2.8169E−03 |
| S2 | 7.6840E−01 | −1.8619E−01 | −1.6285E−01 | 1.7468E−01 |
| S6 | −1.5062E+02 | 2.7087E+02 | −3.3256E+02 | 2.7436E+02 |
| S7 | −1.3479E+01 | 1.9222E+01 | −1.8097E+01 | 1.1201E+01 |
| S8 | −2.8211E+02 | 4.1892E+02 | −4.2269E+02 | 2.8531E+02 |
| S9 | −8.8221E+02 | 1.2526E+03 | −1.2209E+03 | 8.0404E+02 |
| S10 | −1.0859E+03 | 1.5640E+03 | −1.5573E+03 | 1.0548E+03 |
| S11 | 6.8225E+02 | −9.0048E+02 | 8.4376E+02 | −5.4584E+02 |
| S12 | 6.6242E+02 | −8.8434E+02 | 8.4289E+02 | −5.5852E+02 |
| S13 | 2.5120E+01 | −2.5214E+01 | 1.7549E+01 | −8.3724E+00 |

Figure 6A:
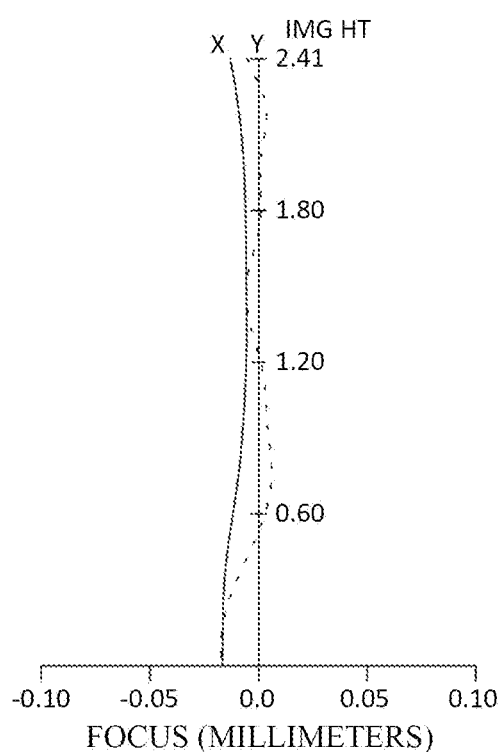
FIGS. 6A to 6C illustrate an astigmatic curve, a distortion curve and a relative illumination curve of the optical imaging lens assembly of the example 3, respectively.
Figure 6B:
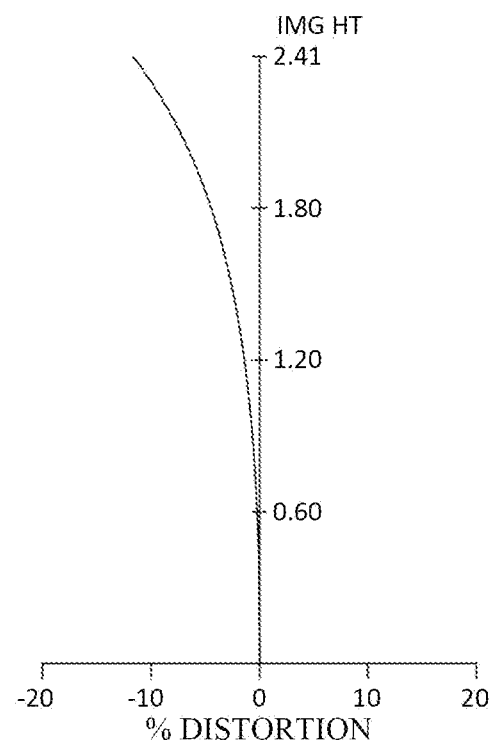
Figure 6C:
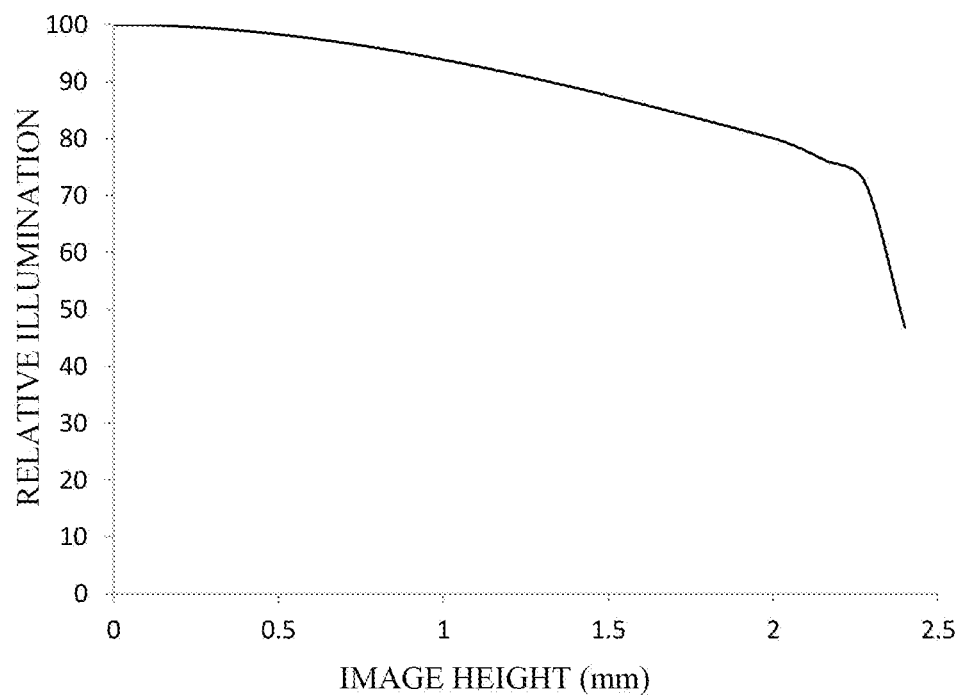

FIG. 6A illustrates the astigmatic curves of the optical imaging lens assembly according to example 3, representing curvatures of a tangential plane and curvatures of a sagittal plane. FIG. 6B illustrates a distortion curve of the optical imaging lens assembly according to example 3, representing the amounts of distortion corresponding to different image heights. FIG. 6C illustrates a relative illumination curve of the optical imaging lens assembly according to example 3, representing the relative illumination values corresponding to different image heights. It can be seen from FIG. 6A to FIG. 6C that the optical imaging lens assembly provided in example 3 may achieve good image quality.

Example 4

Figure 7:
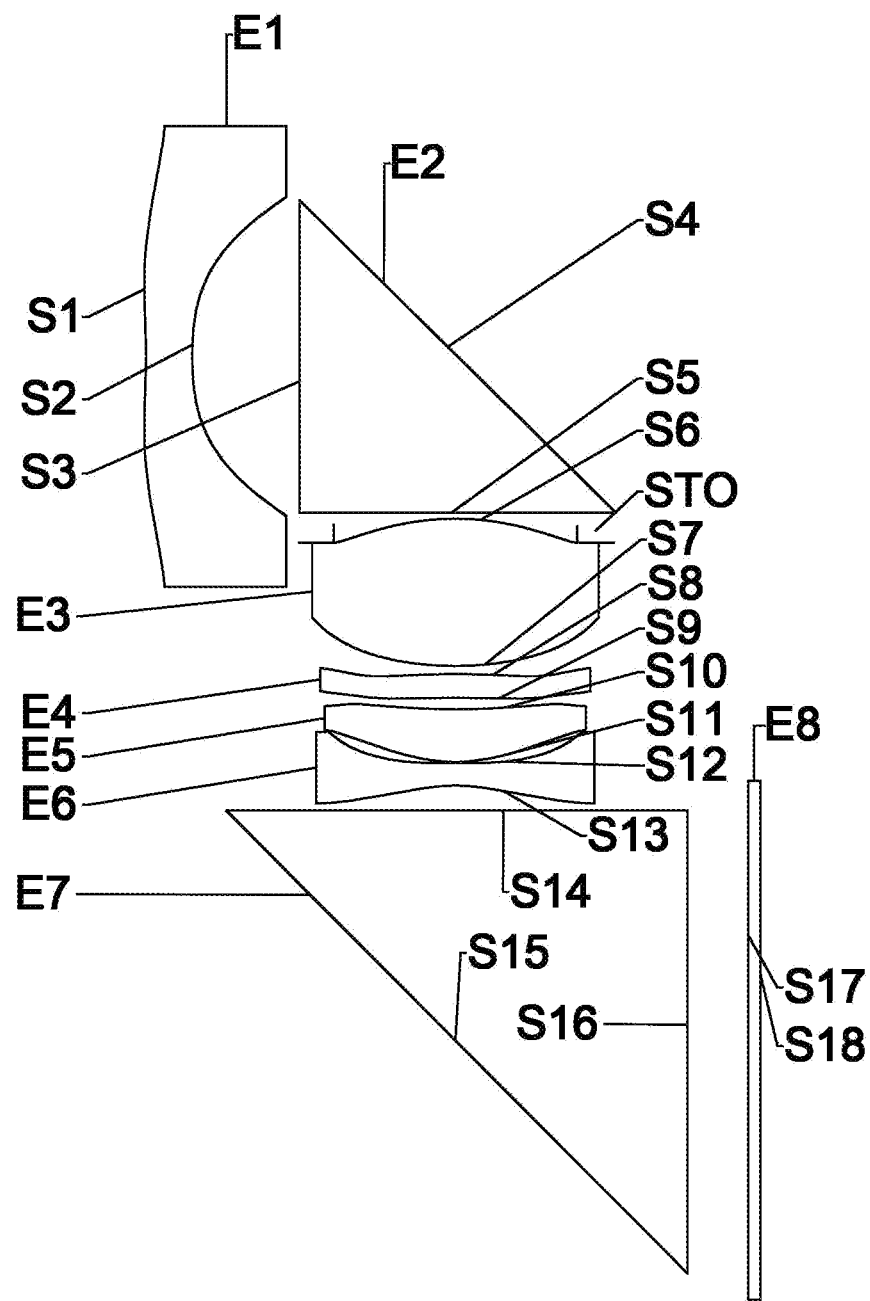
FIG. 7 illustrates a schematic structural view of an optical imaging lens assembly according to example 4 of the present disclosure.

An optical imaging lens assembly according to example 4 of the present disclosure is described below with reference to FIG. 7 to FIG. 8C. FIG. 7 is a schematic structural view of the optical imaging lens assembly according to example 4 of the present disclosure.

As shown in FIG. 7, the optical imaging lens assembly includes a first lens E1, a first prism E2, a stop STO, a second lens E3, a third lens E4, a fourth lens E5, a fifth lens E6, a second prism E7 and an optical filter E8, which are sequentially arranged from an object side to an image side along an optical axis.

The first lens E1 has negative refractive power, an object-side surface S1 thereof is concave, and an image-side surface S2 thereof is concave. An incident surface S3, a reflecting surface S4 and an exit surface S5 of the first prism E2 are spherical. The reflecting surface S4 is at 45° with the optical axis, so that the light incident perpendicular to the incident surface S3 of the first prism E2 is deflected by 90° by the reflecting surface S4 and then exits from the first prism E2 perpendicular to the exit surface S5. The second lens E3 has positive refractive power, an object-side surface S6 thereof is convex, and an image-side surface S7 thereof is convex. The third lens E4 has positive refractive power, an object-side surface S8 thereof is convex, and an image-side surface S9 thereof is concave. The fourth lens E5 has positive refractive power, an object-side surface S10 thereof is concave, and an image-side surface S11 thereof is convex. The fifth lens E6 has negative refractive power, an object-side surface S12 thereof is concave, and an image-side surface S13 thereof is concave. An incident surface S14, a reflecting surface S15 and an exit surface S16 of the second prism E7 are spherical. The reflecting surface S15 is at 45° with the optical axis, so that the light incident perpendicular to the incident surface S14 of the second prism E7 is deflected by 90° by the reflecting surface S15 and then exits from the second prism E7 perpendicular to the exit surface S16. The optical filter E8 has an object-side surface S17 and an image-side surface S18. Light from an object sequentially passes through the respective surfaces S1 to S18 and is finally imaged on an imaging plane S19 (not shown).

In this example, a total effective focal length f of the optical imaging lens assembly satisfies f=2.72 mm, half of a diagonal length ImgH of an effective pixel area on the imaging plane S19 satisfies ImgH=2.40 mm, half of a maximum field-of-view Semi-FOV of the optical imaging lens assembly satisfies Semi-FOV=45.6°, and an aperture value Fno of the optical imaging lens assembly satisfies Fno=2.55.

Table 7 is a table illustrating basic parameters of the optical imaging lens assembly of example 4, wherein the units for the radius of curvature, the thickness and the focal length are millimeter (mm).

TABLE 7

| Surface number | Surface type | Radius of curvature | Thickness/ Distance | Material Refractive index | Material Abbe number | Focal length | Conic coefficient |
|---|---|---|---|---|---|---|---|
| OBJ | Spherical | Infinite | Infinite | | | | |
| S1 | Aspheric | −5.1053 | 0.4163 | 1.55 | 56.1 | −3.31 | 4.5912 |
| S2 | Aspheric | 2.8704 | 0.9704 | | | | −2.6361 |
| S3 | Spherical | Infinite | 1.4100 | 1.52 | 64.2 | | |
| S4 | Spherical | Infinite | −1.4100 | 1.52 | 64.2 | | |
| S5 | Spherical | Infinite | −0.2713 | | | | |
| STO | Spherical | Infinite | −0.2174 | | | | |
| S6 | Aspheric | 2.4732 | 1.3301 | 1.55 | 56.1 | 2.70 | 1.6660 |
| S7 | Aspheric | −2.9524 | 0.0686 | | | | −0.1073 |
| S8 | Aspheric | 5.0328 | 0.2173 | 1.67 | 20.4 | 14.18 | −28.6401 |
| S9 | Aspheric | 10.5679 | 0.1048 | | | | −32.0712 |
| S10 | Aspheric | −5.9608 | 0.4758 | 1.55 | 56.1 | 2.99 | −52.4234 |
| S11 | Aspheric | −1.3184 | 0.0100 | | | | −1.1167 |

TABLE 7-continued

| Surface number | Surface type | Radius of curvature | Thickness/ Distance | Material Refractive index | Abbe number | Focal length | Conic coefficient |
|---|---|---|---|---|---|---|---|
| S12 | Aspheric | −21.2087 | 0.2000 | 1.67 | 20.4 | −2.01 | 84.8102 |
| S13 | Aspheric | 1.4347 | 0.2000 | | | | −9.8466 |
| S14 | Spherical | Infinite | 2.1000 | 1.52 | 64.2 | | |
| S15 | Spherical | Infinite | 2.1000 | 1.52 | 64.2 | | |
| S16 | Spherical | Infinite | 0.5505 | | | | |
| S17 | Spherical | Infinite | 0.1100 | 1.52 | 64.2 | | |
| S18 | Spherical | Infinite | 0.1397 | | | | |
| S19 | Spherical | Infinite | | | | | |

In example 4, the object-side surface and the image-side surface of any one of the first lens E1 to the fifth lens E6 are aspheric. Table 8 below shows high-order coefficients A4, A6, A8, A10, A12, A14, A16, A18 and A20 applicable to each aspheric surface in example 4, wherein the surface shape of each aspheric surface may be defined by the formula (1) given in the above example 1.

TABLE 8

| Surface number | A4 | A6 | A8 | A10 | A12 |
|---|---|---|---|---|---|
| S1 | 1.9431E−01 | −1.5682E−01 | 8.8993E−02 | −9.3520E−03 | −3.8393E−02 |
| S2 | 2.3054E−01 | −1.4444E−02 | −4.4667E−01 | 1.2650E+00 | −2.0172E+00 |
| S6 | 2.4424E−02 | −2.0823E−01 | 2.1382E+00 | −1.2249E+01 | 4.5108E+01 |
| S7 | 4.9858E−03 | 5.0511E−02 | 8.0895E−01 | −6.4464E+00 | 2.2150E+01 |
| S8 | 5.4841E−02 | −5.7778E−01 | 7.9145E+00 | −4.1289E+01 | 1.2323E+02 |
| S9 | 5.9369E−02 | −1.2535E+00 | 1.4446E+01 | −6.8789E+01 | 1.8689E+02 |
| S10 | 1.0453E−02 | −1.2809E+00 | 1.3802E+01 | −6.5577E+01 | 1.7925E+02 |
| S11 | −6.5597E−01 | 3.9500E+00 | −1.8270E+01 | 5.8934E+01 | −1.3738E+02 |
| S12 | 1.5936E−01 | 1.3824E+00 | −9.1590E+00 | 2.9231E+01 | −5.5585E+01 |
| S13 | 3.2505E−01 | −1.2348E+00 | 3.8748E+00 | −9.7277E+00 | 1.9073E+01 |

| Surface number | A14 | A16 | A18 | A20 |
|---|---|---|---|---|
| S1 | 4.1092E−02 | −2.3061E−02 | 8.2228E−03 | −1.9210E−03 |
| S2 | 2.1069E+00 | −1.4960E+00 | 7.2545E−01 | −2.3681E−01 |
| S6 | −1.1103E+02 | 1.8654E+02 | −2.1455E+02 | 1.6612E+02 |
| S7 | −4.4729E+01 | 5.8437E+01 | −5.1009E+01 | 2.9637E+01 |
| S8 | −2.3742E+02 | 3.1122E+02 | −2.8203E+02 | 1.7437E+02 |
| S9 | −3.2428E+02 | 3.7842E+02 | −3.0288E+02 | 1.6508E+02 |
| S10 | −3.1416E+02 | 3.7143E+02 | −3.0243E+02 | 1.6879E+02 |
| S11 | 2.3651E+02 | −3.0145E+02 | 2.8012E+02 | −1.8356E+02 |
| S12 | 6.3234E+01 | −3.5456E+01 | −5.3357E+00 | 2.3574E+01 |
| S13 | −2.8495E+01 | 3.1751E+01 | −2.5705E+01 | 1.4556E+01 |

FIG. 8A illustrates astigmatic curves of the optical imaging lens assembly according to example 4, representing the curvatures of a tangential plane and the curvatures of a sagittal plane. FIG. 8B illustrates a distortion curve of the optical imaging lens assembly according to example 4, representing the amounts of distortion corresponding to different image heights. FIG. 8C illustrates a relative illumination curve of the optical imaging lens assembly according to example 4, representing the relative illumination values corresponding to different image heights. It can be seen from FIG. 8A to FIG. 8C that the optical imaging lens assembly provided in example 4 may achieve good image quality.

Example 5

Figure 9:
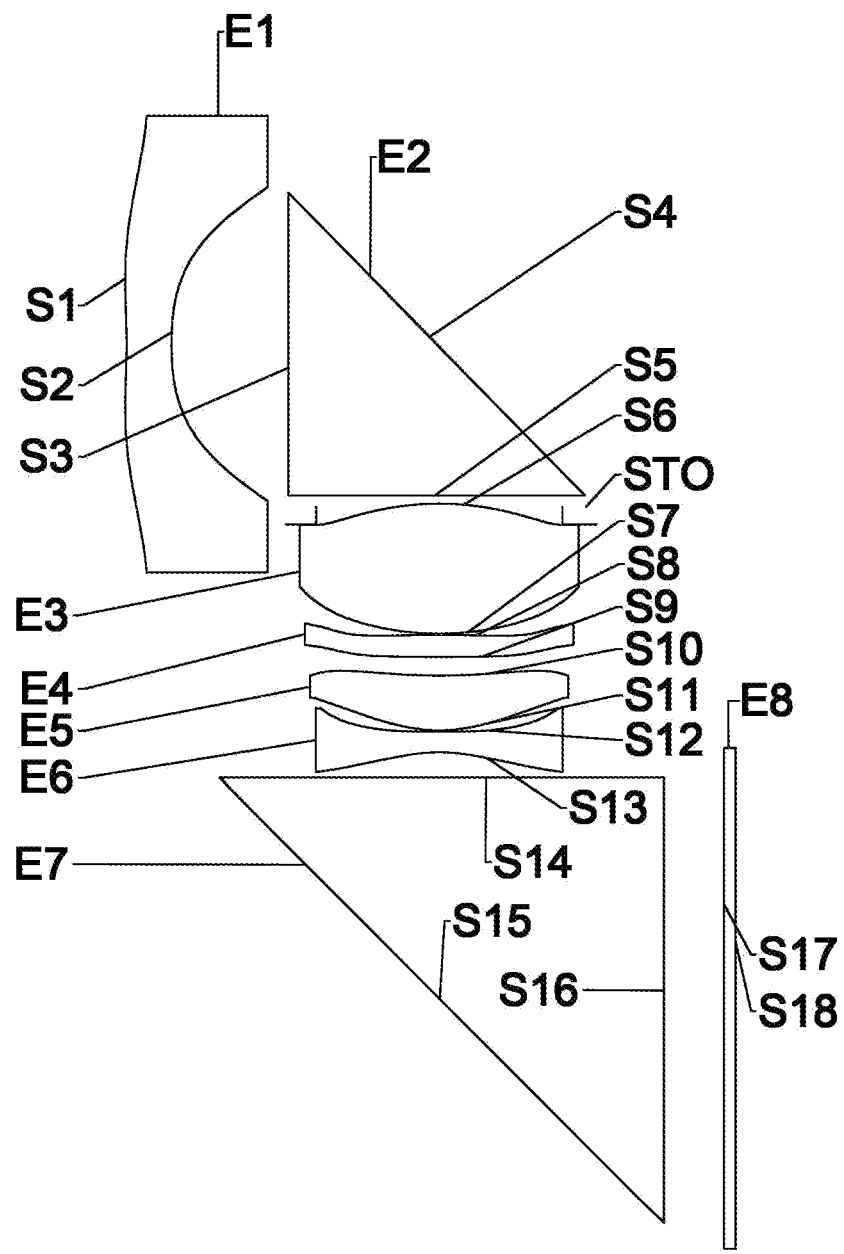
FIG. 9 illustrates a schematic structural view of an optical imaging lens assembly according to example 5 of the present disclosure.

An optical imaging lens assembly according to example 5 of the present disclosure is described below with reference to FIG. 9 to FIG. 10C. FIG. 9 is a schematic structural view of the optical imaging lens assembly according to example 5 of the present disclosure.

As shown in FIG. 9, the optical imaging lens assembly includes a first lens E1, a first prism E2, a stop STO, a second lens E3, a third lens E4, a fourth lens E5, a fifth lens E6, a second prism E7 and an optical filter E8, which are sequentially arranged from an object side to an image side along an optical axis.

The first lens E1 has negative refractive power, an object-side surface S1 thereof is concave, and an image-side surface S2 thereof is concave. An incident surface S3, a reflecting surface S4 and an exit surface S5 of the first prism E2 are spherical. The reflecting surface S4 is at 45° with the optical axis, so that the light incident perpendicular to the incident surface S3 of the first prism E2 is deflected by 90° by the reflecting surface S4 and then exits from the first prism E2 perpendicular to the exit surface S5. The second lens E3 has positive refractive power, an object-side surface S6 thereof is convex, and an image-side surface S7 thereof is convex. The third lens E4 has positive refractive power, an object-side surface S8 thereof is convex, and an image-side surface S9 thereof is convex. The fourth lens E5 has positive refractive power, an object-side surface S10 thereof is concave, and an image-side surface S11 thereof is convex. The fifth lens E6 has negative refractive power, an object-side surface S12 thereof is concave, and an image-side surface S13 thereof is concave. An incident surface S14, a reflecting surface S15 and an exit surface S16 of the second prism E7 are spherical. The reflecting surface S15 is at 45° with the optical axis, so that the light incident perpendicular to the incident surface S14 of the second prism E7 is deflected by 90° by the reflecting surface S15 and then exits from the second prism E7 perpendicular to the exit surface S16. The optical filter E8 has an object-side surface S17 and an image-side surface S18. Light from an object sequentially passes through the respective surfaces S1 to S18 and is finally imaged on an imaging plane S19 (not shown).

In this example, a total effective focal length f of the optical imaging lens assembly satisfies f=2.60 mm, half of a diagonal length ImgH of an effective pixel area on the imaging plane S19 satisfies ImgH=2.40 mm, half of a maximum field-of-view Semi-FOV of the optical imaging lens assembly satisfies Semi-FOV=47.6°, and an aperture value Fno of the optical imaging lens assembly satisfies Fno=2.40.

Table 9 is a table illustrating basic parameters of the optical imaging lens assembly of example 5, wherein the units for the radius of curvature, the thickness and the focal length are millimeter (mm).

TABLE 9

| Surface number | Surface type | Radius of curvature | Thickness/ Distance | Refractive index | Abbe number | Focal length | Conic coefficient |
|---|---|---|---|---|---|---|---|
| OBJ | Spherical | Infinite | Infinite | | | | |
| S1 | Aspheric | −5.1557 | 0.4169 | 1.55 | 56.1 | −3.28 | 4.4628 |
| S2 | Aspheric | 2.8158 | 1.0935 | | | | −2.5177 |
| S3 | Spherical | Infinite | 1.4100 | 1.52 | 64.2 | | |
| S4 | Spherical | Infinite | −1.4100 | 1.52 | 64.2 | | |
| S5 | Spherical | Infinite | −0.2713 | | | | |
| STO | Spherical | Infinite | −0.1947 | | | | |
| S6 | Aspheric | 2.7493 | 1.2123 | 1.55 | 56.1 | 2.77 | 2.2864 |
| S7 | Aspheric | −2.8302 | 0.0100 | | | | −0.6692 |
| S8 | Aspheric | 7.9619 | 0.2064 | 1.67 | 20.4 | 11.17 | −43.9690 |
| S9 | Aspheric | −115.2094 | 0.1746 | | | | 8.6289 |
| S10 | Aspheric | −5.2397 | 0.5123 | 1.55 | 56.1 | 3.15 | −82.1109 |
| S11 | Aspheric | −1.3406 | 0.0100 | | | | −1.0381 |
| S12 | Aspheric | −84.2489 | 0.1900 | 1.67 | 20.4 | −2.08 | −99.0000 |
| S13 | Aspheric | 1.4101 | 0.1948 | | | | −8.5606 |
| S14 | Spherical | Infinite | 2.1000 | 1.52 | 64.2 | | |
| S15 | Spherical | Infinite | 2.1000 | 1.52 | 64.2 | | |
| S16 | Spherical | Infinite | 0.5605 | | | | |
| S17 | Spherical | Infinite | 0.1100 | 1.52 | 64.2 | | |
| S18 | Spherical | Infinite | 0.1498 | | | | |
| S19 | Spherical | Infinite | | | | | |

In example 5, the object-side surface and the image-side surface of any one of the first lens E1 to the fifth lens E6 are aspheric. Table 10 below shows high-order coefficients A4, A6, A8, A10, A12, A14, A16, A18 and A20 applicable to each aspheric surface in example 5, wherein the surface shape of each aspheric surface may be defined by the formula (1) given in the above example 1.

TABLE 10

| Surface number | A4 | A6 | A8 | A10 | A12 |
|---|---|---|---|---|---|
| S1 | 2.0578E−01 | −1.7456E−01 | 1.1361E−01 | −3.9774E−02 | −9.3510E−03 |
| S2 | 2.4814E−01 | −7.2595E−02 | −1.6763E−01 | 3.3899E−01 | −3.1806E−02 |
| S6 | 2.1515E−02 | −1.5464E−01 | 1.4467E+00 | −7.5314E+00 | 2.5337E+01 |
| S7 | 1.0823E−01 | −6.6115E−01 | 2.6779E+00 | −7.9955E+00 | 1.7925E+01 |
| S8 | 1.3599E−01 | −5.6529E−01 | 3.8799E+00 | −1.7807E+01 | 5.4781E+01 |
| S9 | −1.0829E−02 | 2.5451E−01 | 7.5610E−01 | −9.1583E+00 | 3.7006E+01 |
| S10 | −3.3291E−02 | 2.1167E−01 | 2.3696E−01 | −6.2263E+00 | 2.8673E+01 |
| S11 | −2.7551E−01 | 9.0913E−02 | 2.0985E+00 | −1.0625E+01 | 3.0803E+01 |
| S12 | 5.0826E−01 | −2.5051E+00 | 1.0421E+01 | −3.0424E+01 | 6.3333E+01 |
| S13 | 3.8397E−01 | −1.9413E+00 | 6.6906E+00 | −1.4953E+01 | 1.9486E+01 |

| Surface number | A14 | A16 | A18 | A20 |
|---|---|---|---|---|
| S1 | 2.0959E−02 | −1.3164E−02 | 4.8259E−03 | −1.1265E−03 |
| S2 | −7.3614E−01 | 1.2853E+00 | −1.1432E+00 | 6.1249E−01 |

TABLE 10-continued

| | | | | |
|---|---|---|---|---|
| S6 | −5.7080E+01 | 8.7899E+01 | −9.2721E+01 | 6.5858E+01 |
| S7 | −2.9195E+01 | 3.4014E+01 | −2.7921E+01 | 1.5714E+01 |
| S8 | −1.1396E+02 | 1.6242E+02 | −1.5837E+02 | 1.0356E+02 |
| S9 | −8.7593E+01 | 1.3455E+02 | −1.3769E+02 | 9.3124E+01 |
| S10 | −7.3835E+01 | 1.2129E+02 | −1.3153E+02 | 9.3820E+01 |
| S11 | −6.2288E+01 | 9.0840E+01 | −9.4639E+01 | 6.8341E+01 |
| S12 | −9.5379E+01 | 1.0490E+02 | −8.4479E+01 | 4.9520E+01 |
| S13 | −6.9944E+00 | −2.3103E+01 | 4.7657E+01 | −4.5417E+01 |

Figure 10A:
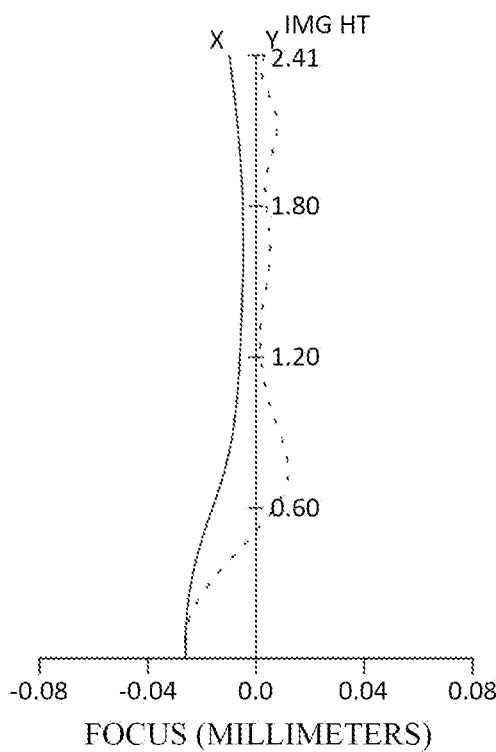
FIGS. 10A to 10C illustrate an astigmatic curve, a distortion curve and a relative illumination curve of the optical imaging lens assembly of the example 5, respectively.
Figure 10B:
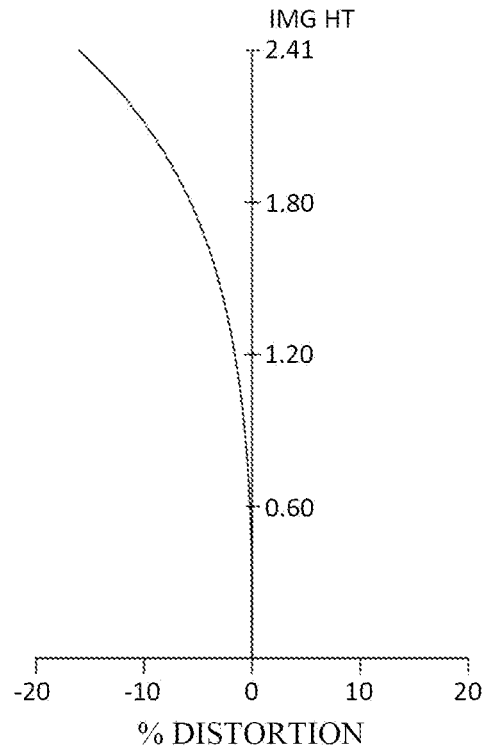
Figure 10C:
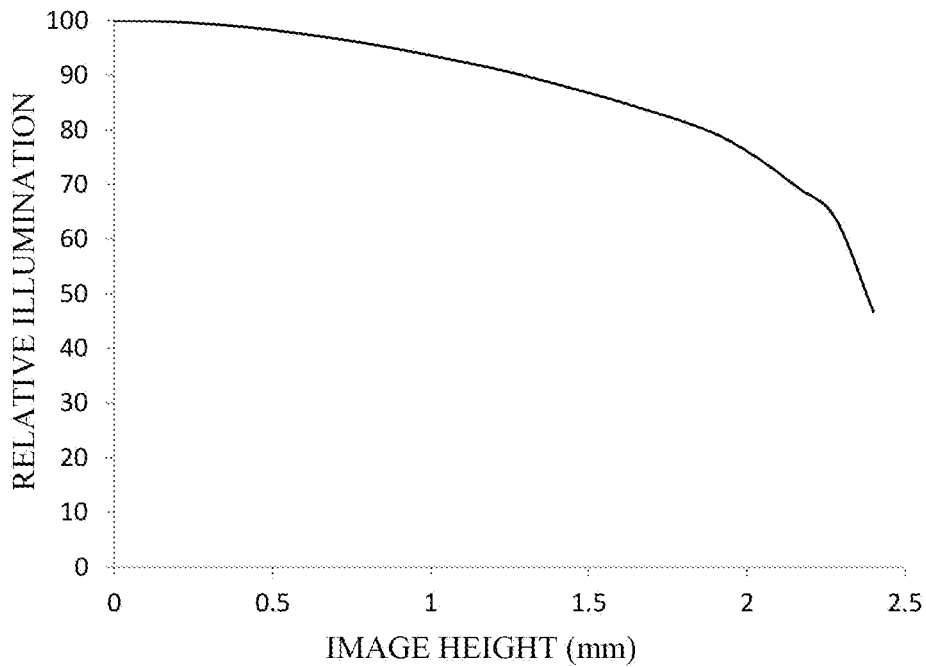

FIG. 10A illustrates the astigmatic curves of the optical imaging lens assembly according to example 5, representing the curvatures of a tangential plane and the curvatures of a sagittal plane. FIG. 10B illustrates a distortion curve of the optical imaging lens assembly according to example 5, representing the amounts of distortion corresponding to different image heights. FIG. 10C illustrates a relative illumination curve of the optical imaging lens assembly according to example 5, representing the relative illumination values corresponding to different image heights. It can be seen from FIG. 10A to FIG. 10C that the optical imaging lens assembly provided in example 5 may achieve good image quality.

Example 6

Figure 11:
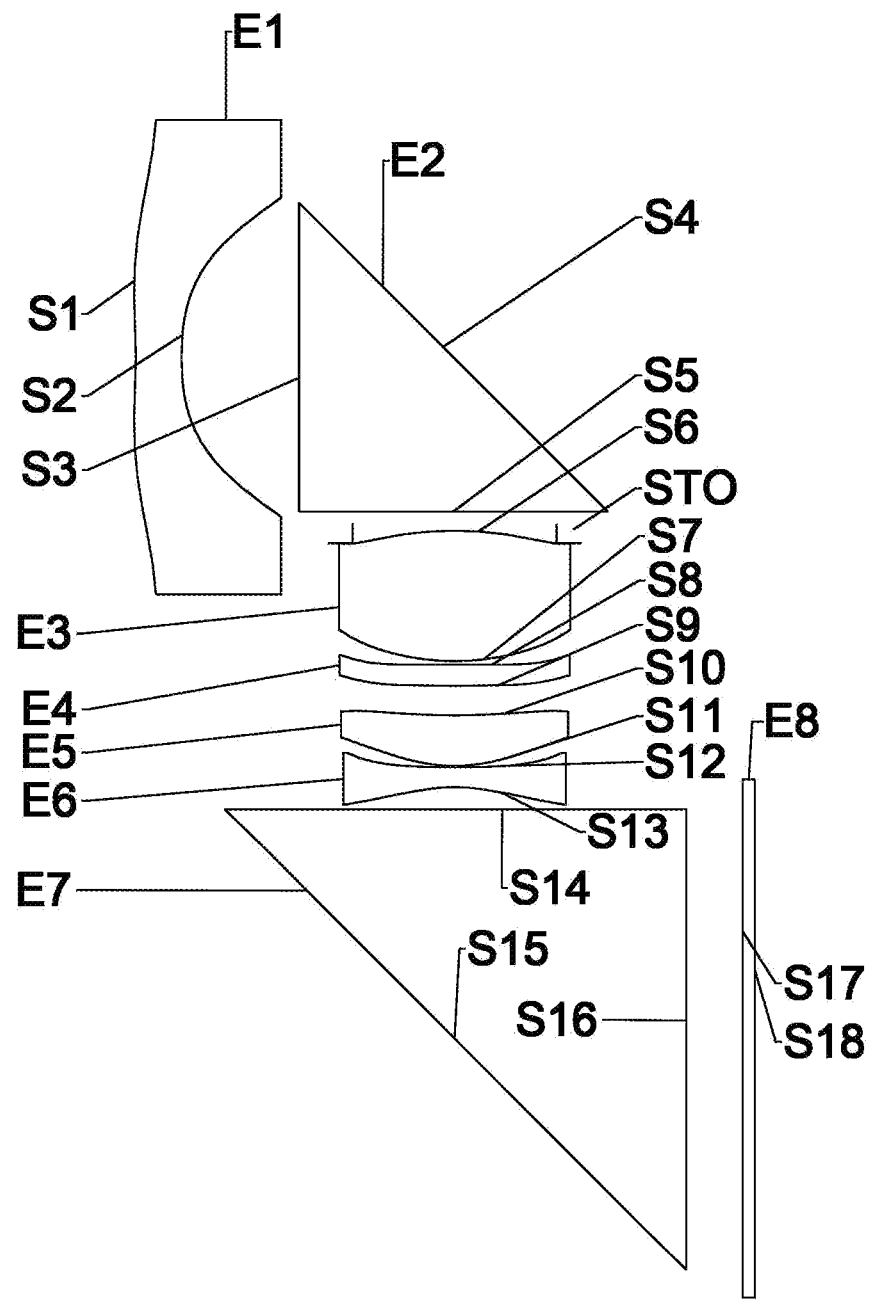
FIG. 11 illustrates a schematic structural view of an optical imaging lens assembly according to example 6 of the present disclosure.

An optical imaging lens assembly according to example 6 of the present disclosure is described below with reference to FIG. 11 to FIG. 12C. FIG. 11 is a schematic structural view of the optical imaging lens assembly according to example 6 of the present disclosure.

As shown in FIG. 11, the optical imaging lens assembly includes a first lens E1, a first prism E2, a stop STO, a second lens E3, a third lens E4, a fourth lens E5, a fifth lens E6, a second prism E7 and an optical filter E8, which are sequentially arranged from an object side to an image side along an optical axis.

The first lens E1 has negative refractive power, an object-side surface S1 thereof is concave, and an image-side surface S2 thereof is concave. An incident surface S3, a reflecting surface S4 and an exit surface S5 of the first prism E2 are spherical. The reflecting surface S4 is at 45° with the optical axis, so that the light incident perpendicular to the incident surface S3 of the first prism E2 is deflected by 90° by the reflecting surface S4 and then exits from the first prism E2 perpendicular to the exit surface S5. The second lens E3 has positive refractive power, an object-side surface S6 thereof is convex, and an image-side surface S7 thereof is convex. The third lens E4 has positive refractive power, an object-side surface S8 thereof is convex, and an image-side surface S9 thereof is convex. The fourth lens E5 has positive refractive power, an object-side surface S10 thereof is concave, and an image-side surface S11 thereof is convex. The fifth lens E6 has negative refractive power, an object-side surface S12 thereof is convex, and an image-side surface S13 thereof is concave. An incident surface S14, a reflecting surface S15 and an exit surface S16 of the second prism E7 are spherical. The reflecting surface S15 is at 45° with the optical axis, so that the light incident perpendicular to the incident surface S14 of the second prism E7 is deflected by 90° by the reflecting surface S15 and then exits from the second prism E7 perpendicular to the exit surface S16. The optical filter E8 has an object-side surface S17 and an image-side surface S18. Light from an object sequentially passes through the respective surfaces S1 to S18 and is finally imaged on an imaging plane S19 (not shown).

In this example, a total effective focal length f of the optical imaging lens assembly satisfies f=2.42 mm, half of a diagonal length ImgH of an effective pixel area on the imaging plane S19 satisfies ImgH=2.40 mm, half of a maximum field-of-view Semi-FOV of the optical imaging lens assembly satisfies Semi-FOV=51.1°, and an aperture value Fno of the optical imaging lens assembly satisfies Fno=2.80.

Table 11 is a table illustrating basic parameters of the optical imaging lens assembly of example 6, wherein the units for the radius of curvature, the thickness and the focal length are millimeter (mm).

TABLE 11

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | −5.1662 | 0.4131 | 1.55 | 56.1 | −3.08 | 4.4363 |
| S2 | Aspheric | 2.5659 | 1.0666 | | | | −2.4719 |
| S3 | Spherical | Infinite | 1.4100 | 1.52 | 64.2 | | |
| S4 | Spherical | Infinite | −1.4100 | 1.52 | 64.2 | | |
| S5 | Spherical | Infinite | −0.2713 | | | | |
| STO | Spherical | Infinite | −0.1139 | | | | |
| S6 | Aspheric | 3.1270 | 1.1794 | 1.55 | 56.1 | 2.62 | 1.6432 |
| S7 | Aspheric | −2.2896 | 0.0305 | | | | −0.5742 |
| S8 | Aspheric | 19.5028 | 0.1930 | 1.67 | 20.4 | 17.58 | −41.8561 |
| S9 | Aspheric | −29.2848 | 0.2668 | | | | 99.0000 |
| S10 | Aspheric | −5.4903 | 0.4574 | 1.55 | 56.1 | 3.16 | −99.0000 |
| S11 | Aspheric | −1.3521 | 0.0100 | | | | −1.0165 |
| S12 | Aspheric | 500.0000 | 0.1800 | 1.67 | 20.4 | −2.18 | −99.0000 |
| S13 | Aspheric | 1.4468 | 0.1717 | | | | −8.6901 |
| S14 | Spherical | Infinite | 2.1000 | 1.52 | 64.2 | | |
| S15 | Spherical | Infinite | 2.1000 | 1.52 | 64.2 | | |
| S16 | Spherical | Infinite | 0.5105 | | | | |

TABLE 11-continued

| Surface number | Surface type | Radius of curvature | Thickness/ Distance | Material Refractive index | Abbe number | Focal length | Conic coefficient |
|---|---|---|---|---|---|---|---|
| S17 | Spherical | Infinite | 0.1100 | 1.52 | 64.2 | | |
| S18 | Spherical | Infinite | 0.1238 | | | | |
| S19 | Spherical | Infinite | | | | | |

In example 6, the object-side surface and the image-side surface of any one of the first lens E1 to the fifth lens E6 are aspheric. Table 12 below shows high-order coefficients A4, A6, A8, A10, A12, A14, A16, A18 and A20 applicable to each aspheric surface in example 6, wherein the surface shape of each aspheric surface may be defined by the formula (1) given in the above example 1.

TABLE 12

| Surface number | A4 | A6 | A8 | A10 | A12 |
|---|---|---|---|---|---|
| S1 | 2.0530E−01 | −1.5975E−01 | 7.3069E−02 | 1.5708E−02 | −5.6699E−02 |
| S2 | 2.5101E−01 | −7.9466E−02 | 5.1693E−02 | −7.6656E−01 | 2.8075E+00 |
| S6 | 1.9321E−02 | −8.0612E−02 | 1.4388E+00 | −1.2650E+01 | 7.0185E+01 |
| S7 | 1.2633E−01 | −1.2396E+00 | 8.0099E+00 | −3.5967E+01 | 1.1356E+02 |
| S8 | 1.8134E−01 | −1.2270E+00 | 9.2164E+00 | −4.5582E+01 | 1.5441E+02 |
| S9 | 2.3532E−02 | −3.6418E−03 | 1.6910E+00 | −1.0173E+01 | 3.1467E+01 |
| S10 | −4.2403E−02 | −1.9504E−02 | 3.4097E+00 | −2.6182E+01 | 1.0864E+02 |
| S11 | −3.8667E−01 | 1.3650E+00 | −1.0044E+00 | −2.9666E+01 | 1.9795E+02 |
| S12 | 4.3112E−01 | −1.6217E+00 | 1.1820E+01 | −8.5905E+01 | 4.0998E+02 |
| S13 | 3.9811E−01 | −2.1252E+00 | 9.8567E+00 | −4.1052E+01 | 1.3730E+02 |

| Surface number | A14 | A16 | A18 | A20 |
|---|---|---|---|---|
| S1 | 4.7944E−02 | −2.3696E−02 | 7.6466E−03 | −1.6351E−03 |
| S2 | −5.2271E+00 | 5.9567E+00 | −4.4067E+00 | 2.1313E+00 |
| S6 | −2.5705E+02 | 6.3754E+02 | −1.0765E+03 | 1.2187E+03 |
| S7 | −2.5377E+02 | 4.0525E+02 | −4.6144E+02 | 3.6654E+02 |
| S8 | −3.7422E+02 | 6.6824E+02 | −8.7619E+02 | 8.1399E+02 |
| S9 | −6.5800E+01 | 1.1314E+02 | −1.6785E+02 | 1.8949E+02 |
| S10 | −3.0136E+02 | 5.9556E+02 | −8.4260E+02 | 8.2739E+02 |
| S11 | −6.7617E+02 | 1.4709E+03 | −2.1471E+03 | 2.0988E+03 |
| S12 | −1.2782E+03 | 2.7020E+03 | −3.9282E+03 | 3.8786E+03 |
| S13 | −3.3952E+02 | 6.0324E+02 | −7.5877E+02 | 6.5940E+02 |

Figure 12A:
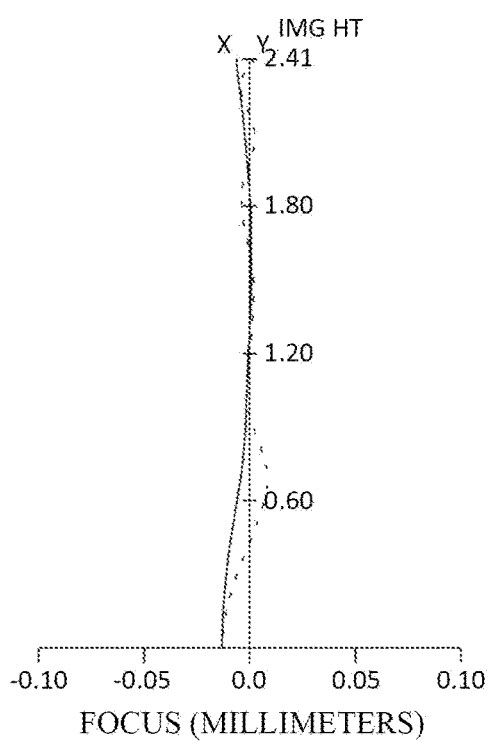
FIGS. 12A to 12C illustrate an astigmatic curve, a distortion curve and a relative illumination curve of the optical imaging lens assembly of the example 6, respectively.
Figure 12B:
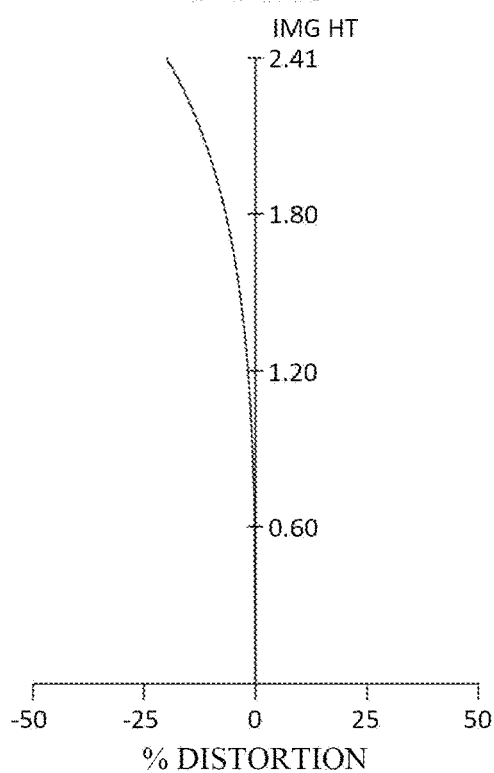
Figure 12C:
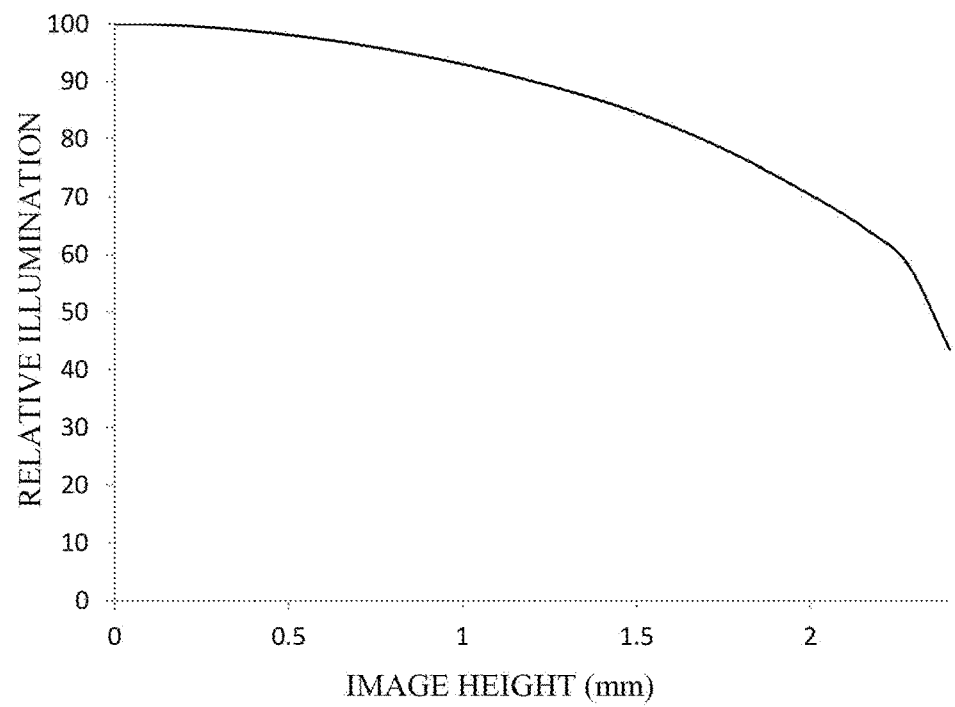

FIG. 12A illustrates the astigmatic curves of the optical imaging lens assembly according to example 6, representing the curvatures of a tangential plane and the curvatures of a sagittal plane. FIG. 12B illustrates a distortion curve of the optical imaging lens assembly according to example 6, representing the amounts of distortion corresponding to different image heights. FIG. 12C illustrates a relative illumination curve of the optical imaging lens assembly according to example 6. It can be seen from FIG. 12A to FIG. 12C that the optical imaging lens assembly provided in example 6 may achieve good image quality.

In view of the above, examples 1 to 6 respectively satisfy the relationship shown in Table 13.

TABLE 13

| Conditional | Example 1 | 2 | 3 | 4 | 5 | 6 |
|---|---|---|---|---|---|---|
| $f*\tan^2(FOV/2)$ (mm) | 2.58 | 2.58 | 2.67 | 2.84 | 3.12 | 3.72 |
| f34/f23 | 2.03 | 1.58 | 1.38 | 1.11 | 1.13 | 1.19 |
| f1/f5 | 0.83 | 1.07 | 1.29 | 1.65 | 1.58 | 1.42 |
| f345/f5 | −2.53 | −3.41 | −4.38 | −6.40 | −7.78 | −6.00 |
| (R1 − R2)/(R1 + R2) | 3.70 | 3.77 | 3.73 | 3.57 | 3.41 | 2.97 |
| f345/R10 | 7.34 | 7.97 | 8.56 | 8.96 | 11.46 | 9.02 |
| SAG12/SAG11 | 4.61 | 4.22 | 4.56 | 5.04 | 4.81 | 4.95 |
| CT4/T45 | 24.60 | 40.96 | 41.09 | 47.58 | 51.23 | 45.74 |
| SAG22/SAG31 | 6.49 | 7.59 | 6.99 | 8.49 | 4.14 | 3.39 |
| (DT21 + DT22)/(DT22 − DT21) | 12.93 | 12.89 | 11.91 | 12.47 | 16.14 | 16.21 |
| FOV (°) | 88.2 | 88.3 | 89.3 | 91.3 | 95.3 | 102.2 |

The present disclosure further provides an imaging apparatus, which is provided with an electronic photosensitive element for imaging. The electronic photosensitive element may be a photosensitive Charge-Coupled Device (CCD) or a Complementary Metal-Oxide Semiconductor (CMOS). The imaging apparatus may be an independent imaging device, such as a digital camera, or may be an imaging module integrated in a mobile electronic device, such as a mobile phone. The imaging apparatus is equipped with the optical imaging lens assembly described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens assembly, sequentially from an object side to an image side of the optical imaging lens assembly along an optical axis, comprising:
    a first lens having negative refractive power;
    a first prism having an incident surface, a reflecting surface, and an exit surface, and an angle between the reflecting surface of the first prism and the optical axis being 45°;
    a stop;
    a second lens having positive refractive power;
    a third lens having refractive power;
    a fourth lens having positive refractive power;
    a fifth lens having negative refractive power; and
    a second prism having an incident surface, a reflecting surface, and an exit surface, and an angle between the reflecting surface of the second prism and the optical axis being 45°,
    wherein
    $1.00 < f34/f23 < 2.50$,
    f23 is a combined focal length of the second lens and the third lens,
    f34 is a combined focal length of the third lens and the fourth lens,
    $7.00 < f345/R10 < 12.00$, and
    f345 is a combined focal length of the third lens, the fourth lens, and the fifth lens, and R10 is a radius of curvature of an image-side surface of the fifth lens.

2. The optical imaging lens assembly according to claim 1, wherein
    $2.50 \text{ mm} < f*\tan^2(FOV/2) < 4.00 \text{ mm}$,
    f is a total effective focal length of the optical imaging lens assembly, and
    FOV is a maximum field-of-view of the optical imaging lens assembly.

3. The optical imaging lens assembly according to claim 1, wherein $0.50 < f1/f5 < 2.00$,
    where f1 is an effective focal length of the first lens, and f5 is an effective focal length of the fifth lens.

4. The optical imaging lens assembly according to claim 1, wherein $-8.00 < f345/f5 < -2.00$,
    where f345 is a combined focal length of the third lens, the fourth lens, and the fifth lens, and f5 is an effective focal length of the fifth lens.

5. The optical imaging lens assembly according to claim 1, wherein $2.50 < (R1-R2)/(R1+R2) < 4.00$,
    where R1 is a radius of curvature of an object-side surface of the first lens, and R2 is a radius of curvature of an image-side surface of the first lens.

6. The optical imaging lens assembly according to claim 1, wherein $4.00 < SAG12/SAG11 < 5.50$,
    where SAG11 is an on-axis distance from an intersection of an object-side surface of the first lens and the optical axis to a vertex of an effective radius of the object-side surface of the first lens, and SAG12 is an on-axis distance from an intersection of an image-side surface of the first lens and the optical axis to a vertex of an effective radius of the image-side surface of the first lens.

7. The optical imaging lens assembly according to claim 1, wherein $24.00 < CT4/T45 < 52.00$,
    where CT4 is a center thickness of the fourth lens along the optical axis, and T45 is an air interval between the fourth lens and the fifth lens along the optical axis.

8. The optical imaging lens assembly according to claim 1, wherein $3.00 < SAG22/SAG31 < 9.00$,
    where SAG22 is an on-axis distance from an intersection of an image-side surface of the second lens and the optical axis to a vertex of an effective radius of the image-side surface of the second lens, and SAG31 is an on-axis distance from an intersection of an object-side surface of the third lens and the optical axis to a vertex of an effective radius of the object-side surface of the third lens.

9. The optical imaging lens assembly according to claim 1, wherein $11.00 < (DT21+DT22)/(DT22-DT21) < 17.00$,
    where DT21 is a maximum effective radius of an object-side surface of the second lens, and DT22 is a maximum effective radius of an image-side surface of the second lens.

10. The optical imaging lens assembly according to claim 1, wherein $FOV > 88.0°$,
    where FOV is the maximum field-of-view of the optical imaging lens assembly.

11. An optical imaging lens assembly, sequentially from an object side to an image side of the optical imaging lens assembly along an optical axis, comprising:
    a first lens having negative refractive power;
    a first prism having an incident surface, a reflecting surface, and an exit surface, and an angle between the reflecting surface of the first prism and the optical axis being 45°;
    a stop;
    a second lens having positive refractive power;
    a third lens having refractive power;
    a fourth lens having positive refractive power;
    a fifth lens having negative refractive power; and
    a second prism having an incident surface, a reflecting surface, and an exit surface, and an angle between the reflecting surface of the second prism and the optical axis being 45°,
    wherein $2.50 < (R1-R2)/(R1+R2) < 4.00$,
    R1 is a radius of curvature of an object-side surface of the first lens,
    R2 is a radius of curvature of an image-side surface of the first lens,
    $7.00 < f345/R10 < 12.00$, and
    f345 is a combined focal length of the third lens, the fourth lens, and the fifth lens, and R10 is a radius of curvature of an image-side surface of the fifth lens.

12. The optical imaging lens assembly according to claim 11, wherein $0.50 < f1/f5 < 2.00$,
    where f1 is an effective focal length of the first lens, and f5 is an effective focal length of the fifth lens.

13. The optical imaging lens assembly according to claim 11, wherein $2.50 \text{ mm} < f*\tan^2(FOV/2) < 4.00 \text{ mm}$,
    where f is a total effective focal length of the optical imaging lens assembly, and FOV is the maximum field-of-view of the optical imaging lens assembly.

14. The optical imaging lens assembly according to claim 11, wherein $-8.00 < f345/f5 < -2.00$, where f345 is a combined focal length of the third lens, the fourth lens, and the fifth lens, and f5 is an effective focal length of the fifth lens.

15. The optical imaging lens assembly according to claim 11, wherein

FOV>88.0°, and

FOV is a maximum field-of-view of the optical imaging lens assembly.

16. The optical imaging lens assembly according to claim 11, wherein 4.00<SAG12/SAG11<5.50, where SAG11 is an on-axis distance from an intersection of an object-side surface of the first lens and the optical axis to a vertex of an effective radius of the object-side surface of the first lens, and SAG12 is an on-axis distance from an intersection of an image-side surface of the first lens and the optical axis to a vertex of an effective radius of the image-side surface of the first lens.

17. The optical imaging lens assembly according to claim 11, wherein 24.00<CT4/T45<52.00, where CT4 is a center thickness of the fourth lens along the optical axis, and T45 is an air interval between the fourth lens and the fifth lens along the optical axis.

* * * * *